(12) United States Patent
Reid et al.

(10) Patent No.: US 11,642,640 B2
(45) Date of Patent: May 9, 2023

(54) METHOD OF RECYCLING CARBON TO A FEEDSTOCK GAS REACTOR

(71) Applicant: EKONA POWER INC., Burnaby (CA)

(72) Inventors: Christopher Edwin John Reid, Burnaby (CA); Kenneth William Kratschmar, Burnaby (CA); David Aaron Leboe, Burnaby (CA)

(73) Assignee: Ekona Power Inc., Burnaby (CA)

( * ) Notice: Subject to any disclaimer, the term of this patent is extended or adjusted under 35 U.S.C. 154(b) by 0 days.

(21) Appl. No.: 17/802,507

(22) PCT Filed: Nov. 3, 2021

(86) PCT No.: PCT/CA2021/051562
§ 371 (c)(1),
(2) Date: Aug. 25, 2022

(87) PCT Pub. No.: WO2022/126240
PCT Pub. Date: Jun. 23, 2022

(65) Prior Publication Data
US 2023/0088839 A1    Mar. 23, 2023

Related U.S. Application Data

(60) Provisional application No. 63/125,810, filed on Dec. 15, 2020.

(51) Int. Cl.
*B01J 12/00* (2006.01)
*B01J 6/00* (2006.01)
(Continued)

(52) U.S. Cl.
CPC ............. *B01J 12/00* (2013.01); *B01J 6/008* (2013.01); *B01J 19/185* (2013.01); *C01B 3/24* (2013.01);
(Continued)

(58) Field of Classification Search
CPC .......... B01J 12/00; B01J 6/008; B01J 19/185; C01B 3/24; C01B 3/503
See application file for complete search history.

(56) References Cited

U.S. PATENT DOCUMENTS 2,785,053 A * 3/1957 Larson ............... C09C 1/50
422/152
3,284,168 A * 11/1966 Riga ............... C10G 9/36
585/539

(Continued)

FOREIGN PATENT DOCUMENTS

| CN | 102583242 A | 7/2012 |
|---|---|---|
| JP | 2017197399 A | 11/2017 |
| WO | 2020118417 | 6/2020 |

OTHER PUBLICATIONS

Chan Shining et al., "Wave rotor design method with three steps including experimental validation", Journal of Engineering for Gas Turbines and Power, Dec. 2017.

(Continued)

*Primary Examiner* — Matthew J Merkling
(74) *Attorney, Agent, or Firm* — D'Ambrosio & Menon, PLLC; Usha Menon

(57) ABSTRACT

A method of using a feedstock gas reactor is described. A hydrocarbon, such as methane, is chemical decomposed in the feedstock gas reactor using heat of combustion generated from the combustion of a combustible gas. A mixed product stream is extracted from the feedstock gas reactor. The mixed product stream comprises hydrogen, carbon, and water. At least a portion of the one or more combustion product gases are vented from the combustion chamber. At least some of the carbon is activated using the vented one or more combustion product gases. At least some of the activated carbon is recycled to the feedstock gas reactor.

21 Claims, 16 Drawing Sheets

(51) Int. Cl.
*B01J 19/18* (2006.01)
*C01B 3/24* (2006.01)
*C01B 3/50* (2006.01)

(52) U.S. Cl.
CPC ........ *C01B 3/503* (2013.01); *C01B 2203/043* (2013.01); *C01B 2203/0405* (2013.01); *C01B 2203/049* (2013.01); *C01B 2203/0495* (2013.01); *C01B 2203/0827* (2013.01); *C01B 2203/147* (2013.01); *C01B 2203/1614* (2013.01)

(56) References Cited

U.S. PATENT DOCUMENTS

| | | |
|---|---|---|
| 6,670,058 B2 | 12/2003 | Muradov |
| 7,588,746 B1 | 9/2009 | Muradov et al. |
| 9,434,612 B2 | 9/2016 | Hyde et al. |
| 2021/0380407 A1* | 12/2021 | Ashton .................... C01B 3/24 |

OTHER PUBLICATIONS

Abbas, HF et al. "Hydrogen production by methane decomposition: A review", International Journal of Hydrogen Energy. Nov. 27, 2009, vol. 35, pp. 1160-1190.

* cited by examiner

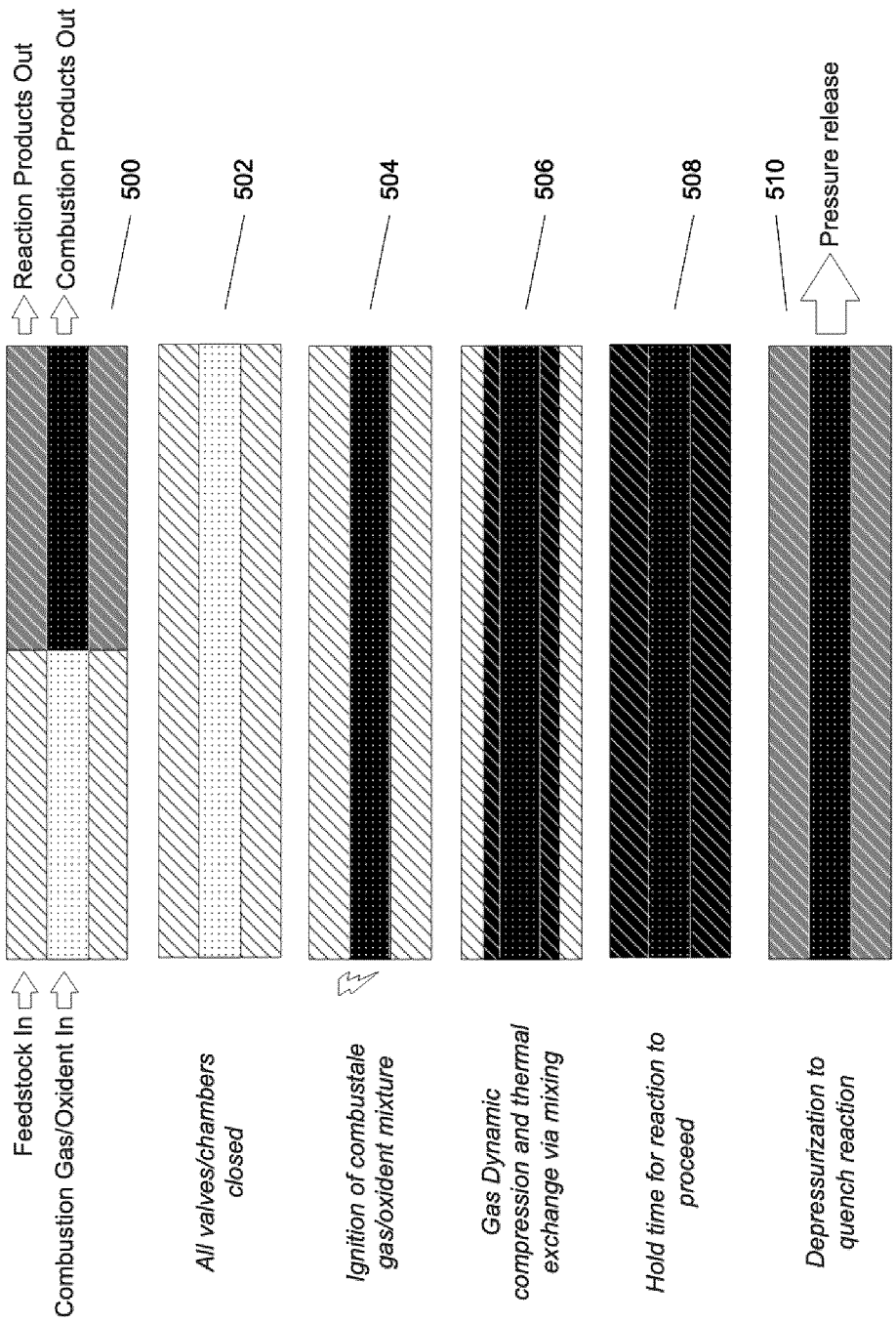

METHOD OF RECYCLING CARBON TO A FEEDSTOCK GAS REACTOR

FIELD OF THE DISCLOSURE

The present disclosure relates to methods and systems for recycling carbon to a feedstock gas reactor. For example, methods and systems described herein may use a carbon catalyst to drive thermal pyrolysis of a hydrocarbon feedstock so as to produce hydrogen.

BACKGROUND TO THE DISCLOSURE

Many industries, including petroleum production, ammonia production, and methanol production, rely on the use of industrial hydrogen gas ($H_2$). Approximately 96% of industrial hydrogen is derived from fossil fuels, with the majority being produced by steam methane reforming (SMR) of natural gas. Such incumbent processes are also responsible for significant greenhouse gas emissions. SMRs, for example, can produce between 10-17 tonnes of carbon dioxide ($CO_2$) per tonne of hydrogen that is produced. Adding $CO_2$ cleanup and sequestration to SMR flue gas streams is generally cost-prohibitive unless penalties for carbon dioxide emissions increase substantially.

Alternative means of sustainable hydrogen production include the production of hydrogen from renewable electricity using an electrolyzer, or decomposing natural gas into pure hydrogen and solid sequesterable carbon using thermal pyrolysis where the heat of reaction is supplied by a source of renewable electricity. Thermal pyrolysis of natural gas is typically a constant-pressure, steady-flow process whereby natural gas is heated until it reaches the temperature required to begin the formation of hydrogen and carbon. At this point, the reaction conditions are sustained for a certain time until the desired products are formed. In such steady-flow reactors, the carbon that is formed tends to build up on the surfaces of the reactor (a process known as carbon fouling), eventually compromising the reactor's performance. Mechanical scraping processes, and burning the carbon off the surfaces by introducing air into the reactor, are two common means of cleaning the reactor, but add system complexity as well as capital and operational costs.

Reaction products can be recycled back to the reactor once recoverable product hydrogen has been separated from the product stream. This mechanism enables unreacted feedstock, residual product gas, and other residual hydrocarbons (for example, unsaturated and aromatic hydrocarbons) to re-enter the reactor for further decomposition and processing until recirculated feedstocks ultimately are converted into the desired end product of $H_2$ and, for example, solid carbon.

Recycled gas can also be used to generate the heat required by the endothermic pyrolysis reaction which may require, for example, nominally 75 kJ of energy input per mol of converted methane. The heat value of recycled product gas is commonly used to supply this energy by oxidation (combustion) in a burner which supplies heat to the reactor. Upon oxidation, the product gas, largely comprising $CO_2$ and water vapour ($H_2O$), is exhausted to the environment resulting in a release of greenhouse gas emissions.

In order to reduce the operating temperature of the thermal pyrolysis reactor, some proposed processes introduce catalysts to the reactor. While initially effective, catalyst effectiveness is reduced due to carbon contamination during operation, requiring the catalyst to be replaced or reactivated.

SUMMARY OF THE DISCLOSURE

According to a first aspect of the disclosure, there is provided a method of using a feedstock gas reactor comprising a reaction chamber fluidly connected to a combustion chamber via one or more fluid flow paths, the method comprising: introducing a feedstock gas comprising a hydrocarbon into the reaction chamber; introducing a combustible gas into the combustion chamber; and combusting the combustible gas in the combustion chamber so as to form one or more combustion product gases and so as to cause at least a portion of the one or more combustion product gases to flow into the reaction chamber via the one or more fluid flow paths and mix with the feedstock gas, wherein, as a result of the mixing of the at a least a portion of the one or more combustion product gases with the feedstock gas, energy is transferred from the at least a portion of the one or more combustion product gases to the feedstock gas and thereby causes a chemical reaction to decompose the feedstock gas into one or more reaction product gases comprising hydrogen; extracting a mixed product stream from the feedstock gas reactor, wherein the mixed product stream comprises hydrogen, carbon, and water; generating a vent gas stream comprising one or more oxidizing gases output from the feedstock gas reactor; activating at least some of the carbon using the vent gas stream; and recycling at least some of the activated carbon to the feedstock gas reactor.

The one or more oxidizing gases may comprise one or more of $O_2$, $CO_2$, CO, $H_2O$, and oxides of $N_2$.

Generating the vent gas stream may comprise venting at least a portion of the one or more combustion product gases from the combustion chamber.

Generating the vent gas stream may comprise: separating at least some of the carbon from the mixed product stream so as to produce a carbon-depleted mixed product stream; and venting one or more gases from the carbon-depleted mixed product stream.

Activating at least some of the carbon may comprise: separating at least some of the carbon from the mixed product stream; and activating the separated carbon.

Separating at least some of the carbon may comprise separating the at least some of the carbon from the mixed product stream using one or more of: a cyclone; a sintered metal filter; and a bag filter.

Activating at least some of the carbon may comprise reacting the at least some of carbon with the vent gas stream.

Activating at least some of the carbon may comprise: heating water with the vent gas stream to produce steam; and reacting the at least some of the carbon with the steam in the carbon contactor.

Heating the water with the vent gas stream may comprise: separating at least some of the water from the mixed product stream; and heating the separated water with the vent gas stream.

Activating at least some of the carbon may comprise activating the at least some of the carbon in a carbon contactor.

The method may further comprise extracting from the carbon contactor an exhaust stream generated from the activation of the at least some of the carbon.

The method may further comprise one or more of: burning the extracted exhaust stream; and using the extracted exhaust stream for chemical or fuel production.

The exhaust stream may comprise CO and $H_2$.

The method may further comprise recycling at least some of the extracted exhaust stream to the mixed product stream.

The method may further comprise separating at least some of the carbon from the mixed product stream to form a carbon-depleted mixed product stream.

Recycling the at least some of the extracted exhaust stream may comprise combining the recycled exhaust stream with the carbon-depleted mixed product stream.

The method may further comprise adjusting the vent gas stream.

Adjusting the vent gas stream may comprise adjusting one or more of: a duration of venting of the one or more gases output from the feedstock gas reactor; a frequency of venting of the one or more gases output from the feedstock gas reactor; a size of one or more vent orifices used for venting of the one or more gases output from the feedstock gas reactor; a number of vents used for venting of one or more gases output from the feedstock gas reactor; and a pressure drop across a vent flow path used for venting of one or more gases output from the feedstock gas reactor.

Adjusting the vent gas stream may comprise adjusting venting of the one or more gases output from the feedstock gas reactor based on a measured or inferred process parameter of the method.

The measured or inferred process parameter may comprise one or more of: a concentration of $H_2$ in the mixed product stream; and a flow of the feedstock gas.

The steps of introducing the feedstock gas, introducing the combustible gas, and combusting the combustible gas may be repeated multiple times as part of multiple corresponding reaction cycles. The step of generating the vent gas stream may be performed every reaction cycle or every preset number of reaction cycles.

The method may further comprise separating at least some of the hydrogen from the mixed product stream.

Separating at least some of the hydrogen may comprise separating at least some of the hydrogen using one or more of: a membrane separator; a polymeric membrane separator; a palladium membrane separator; chemical adsorption; pressure swing adsorption; and temperature swing adsorption.

Separating at least some of the hydrogen may comprise using pressure swing adsorption.

The method may further comprise: separating at least some of the carbon, at least some of the hydrogen, and at least some of the water from the mixed product stream, thereby forming a tail gas stream; and recycling at least a portion of the tail gas stream to the feedstock reactor.

Recycling the tail gas stream to the feedstock gas reactor may comprise: mixing a first fraction of the tail gas stream with an oxidant; and mixing a second fraction of the tail gas stream with a source of the feedstock gas.

The first fraction plus the second fraction may equal 1.

Recycling the tail gas stream may comprise splitting the tail gas stream into the first and second fractions.

Splitting the tail gas stream may comprise using one or more of: a flow splitter; one or more variable control valves; a variable flow diverter; one or more compressors; and one or more pumps.

Mixing the first fraction of the tail gas stream with the oxidant may comprise mixing the first fraction of the tail gas stream with a quantity of oxidant sufficient to drive decomposition of the feedstock gas in the feedstock gas reactor.

Mixing the second fraction of the tail gas stream with the source of the feedstock gas may comprise mixing the second fraction of the tail gas stream with a quantity of the feedstock gas sufficient to enable the quantity of the feedstock gas to reach a target pressure and a target temperature required for decomposition of the quantity of the feedstock gas in the feedstock gas reactor.

The method may further comprise: introducing the mixture of the oxidant and the first fraction of the tail gas stream into the combustion chamber; introducing the mixture of the feedstock gas and the second fraction of the tail gas stream into the reaction chamber; and combusting the mixture of the oxidant and the first fraction of the tail gas stream in the combustion chamber to form one or more combustion product gases and to cause the one or more combustion product gases to flow into the reaction chamber via the one or more fluid flow paths and mix with the mixture of the feedstock gas and the second fraction of the tail gas stream, wherein, as a result of the mixing of the one or more combustion product gases with the mixture of the feedstock gas and the second fraction of the tail gas stream, energy is transferred from the one or more combustion product gases to the feedstock gas and thereby causes a chemical reaction to decompose the feedstock gas into one or more reaction product gases comprising hydrogen.

The method may further comprise adjusting one or more of: a pressure of the feedstock gas at an inlet of the reaction chamber; a temperature of the feedstock gas at the inlet of the reaction chamber; a pressure of the combustible gas at an inlet of the combustion chamber; and a temperature of the combustible gas at the inlet of the combustion chamber; a stoichiometry of air in a combustible gas mixture comprising the combustible gas; a quantity of the one or more combustion product gases vented from the combustion chamber; and a degree of hydrogen separation of a hydrogen separator through which the mixed product stream is passed.

Adjusting the temperature of the feedstock gas may comprise controlling the temperature of the feedstock gas to between about 1,000 K and about 1,300 K.

Adjusting the temperature of the combustible gas may comprise controlling the temperature of the combustible gas to between about 300 K and about 600 K.

Adjusting the pressure of the combustible gas may comprise controlling the pressure of the combustible gas to between about 12 bar and about 15 bar.

Adjusting the pressure of the feedstock gas may comprise controlling the pressure of the feedstock gas to between about 12 bar and about 15 bar.

The combustible gas may comprise pure oxygen.

The feedstock gas may comprise methane or natural gas.

Extracting the mixed product stream may comprise extracting from the reaction chamber at least a portion of reaction product gases formed as a result of the decomposition of the feedstock gas.

Extracting the mixed product stream may comprise extracting at least a portion of the one or more combustion product gases from the combustion chamber.

According to a further aspect of the disclosure, there is provided a system comprising: a feedstock gas reactor comprising: a reaction chamber; and a combustion chamber fluidly connected to the reaction chamber via one or more fluid flow paths; and an igniter; valving for controlling flow of gases into and out of the feedstock gas reactor; and one or more controllers configured to perform a method comprising: controlling the valving to introduce a feedstock gas comprising a hydrocarbon into the reaction chamber; controlling the valving to introduce a combustible gas into the combustion chamber; and controlling the igniter to combust the combustible gas in the combustion chamber so as to form one or more combustion product gases and so as to cause the one or more combustion product gases to flow into the reaction chamber via the one or more fluid flow paths and mix with the feedstock gas, wherein, as a result of the mixing of the one or more combustion product gases with the feedstock gas, energy is transferred from the one or more combustion product gases to the feedstock gas and thereby causes a chemical reaction to decompose the feedstock gas into one or more reaction product gases comprising hydrogen; controlling the valving to extract a mixed product stream from the feedstock gas reactor, wherein the mixed product stream comprises hydrogen, carbon, and water; and controlling the valving to generate a vent gas stream comprising one or more oxidizing gases output from the feedstock gas reactor; controlling the valving to activate at least some of the carbon using the vented one or more combustion product gases; and controlling the valving to recycle at least some of the activated carbon to the feedstock gas reactor.

The system may further comprise a carbon separator for separating at least some of the carbon from the mixed product stream.

The carbon separator may comprise one or more of: a cyclone; a sintered metal filter; and a bag filter.

The system may further comprise a carbon contactor for activating at least some of the carbon.

The carbon contactor may comprise one or more of: a fluidized bed reactor; a packed bed reactor; and a rotary kiln.

The system may further comprise a hydrogen separator for separating at least some of the hydrogen from the mixed product stream.

The hydrogen separator may be pressure swing adsorption device.

The system may further comprise a tail gas stream splitting device for recycling a tail gas stream to the feedstock gas reactor. The tail gas stream may comprise the at least a portion of the mixed product stream with at least some carbon, at least some water, and at least some hydrogen separated therefrom.

The tail gas stream splitting device may be configured to: mix a first fraction of the tail gas stream with an oxidant; and mix a second fraction of the tail gas stream with a source of the feedstock gas.

The tail gas stream splitting device may comprise one or more of: a flow splitter; one or more variable control valves; a variable flow diverter; one or more compressors; and one or more pumps.

The first fraction plus the second fraction may equal 1.

The system may further comprise one or more vents located according to one or more of the following: in the combustion chamber; downstream of the feedstock reactor; downstream of a carbon separator; and in a recirculation line for recycling the at least a portion of the mixed product stream.

The one or more controllers may be further configured to adjust one or more of: a duration that the one or more vents are open; a frequency of opening of the one or more vents; and a size of one or more orifices of the one or more vents.

This summary does not necessarily describe the entire scope of all aspects. Other aspects, features, and advantages will be apparent to those of ordinary skill in the art upon review of the following description of specific embodiments.

BRIEF DESCRIPTION OF THE DRAWINGS

The accompanying drawings illustrate non-limiting example embodiments of the disclosure. The drawings are schematic or simplified representations intended only to clearly illustrate various aspects of the disclosure.

FIG. 5 is a schematic diagram of a method of cracking natural gas, according to an embodiment of the disclosure.

DETAILED DESCRIPTION OF THE DISCLOSURE

The present disclosure seeks to provide methods and systems for recycling carbon to a feedstock gas reactor. While various embodiments of the disclosure are described below, the disclosure is not limited to these embodiments, and variations of these embodiments may well fall within the scope of the disclosure which is to be limited only by the appended claims.

Generally, according to embodiments of the disclosure, there is described a process of operating a hydrocarbon dissociation reactor to produce hydrogen and carbon products of reaction. A portion of the product carbon is activated and introduced into the reactor to catalyze the reaction. By recirculating carbon oxide products of combustion back to the reactor for conversion into product carbon, the process may operate in a closed-loop configuration. The proposed process may significantly reduce greenhouse gas (GHG) emissions compared to incumbent methods of hydrogen production using carbon activation.

To address shortcomings in the prior art, an existing vent gas stream comprising primarily $CO_2$ and $H_2O$ may be used to activate a portion of the produced carbon, prior to the produced carbon being introduced into the reactor. As a result, no additional energy or feedstock streams are required to activate the produced carbon, thereby not adding to the operating cost of the overall system. Furthermore, use of an existing gas stream in order to activate a portion of the produced carbon does not result in additional greenhouse gas emissions.

The process is based at least in part on the pulsed-methane-pyrolysis (PMP) process as described in PCT Publication No. WO 2020/118417 A1, hereby incorporated by reference in its entirety. The current disclosure proposes a novel way to activate produced carbon using a stream of $CO_2$ and $H_2O$ for the purposes of using the activated carbon to catalyze the pyrolysis reaction. This is achieved without an increase in operating costs or greenhouse gas emissions.

With reference to FIGS. 4A-14, there will now be described embodiments of a PMP pyrolyzer or reactor that may be used with any of the methods described herein. The pyrolyzer may operate according to an unsteady, constant-volume pulsed reaction process to produce hydrogen and carbon products from a natural gas-based feedstock. A separate chamber of combustible gases and an oxidant provides the energy for the reaction, and is transferred directly to the feedstock mixing chamber by gas-dynamic compression and rapid mixing thermal energy exchange via direct contact. In the discussion below, air is used as the oxidant; however, other oxidants such as pure oxygen can be used in the process. Furthermore, the feedstock gas and combustible gas can comprise the same gas or gas mixture or can comprise different gases or gas mixtures. In some embodiments, the combustible gas may comprise a recycled gas mixture.

Figure 4A:
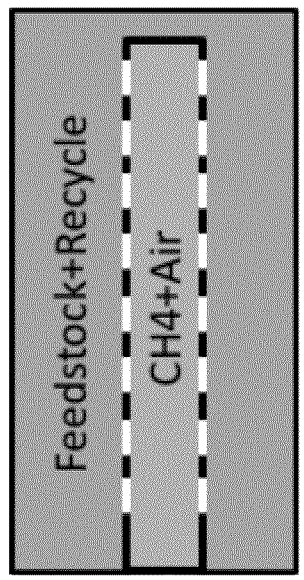
FIGS. 4A and 4B show different arrangements of a mixing chamber and a combustion chamber, according to an embodiment of the disclosure.
Figure 4B:
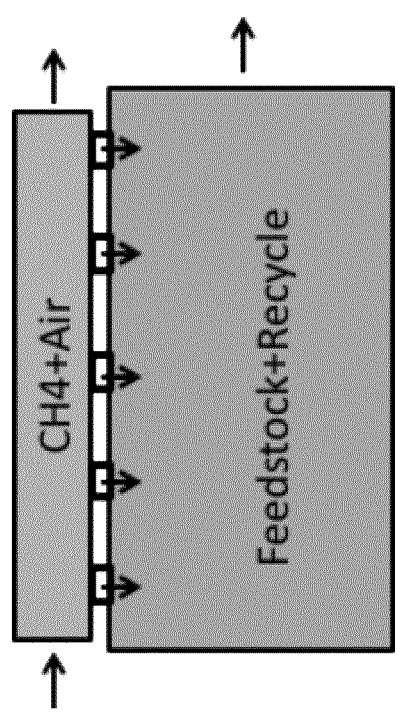

The reactor comprises a mixing chamber and a combustion chamber. These chambers are connected via a number of passageways that are always open. In some embodiments, the reactor comprises a perforated tube (the combustion chamber) within a larger solid tube (the mixing chamber); see FIG. 4A. In other embodiments, the combustion chamber can be external to the mixing chamber (as shown in FIG. 4B). External valves provide the feedstock, oxidant and combustible gas (shown as $CH_4$) as well as the discharged hydrogen, carbon and other gases produced during the reaction.

Turning to FIG. 5, at the start of the cycle, the mixing chamber is filled with the products of the previous reaction cycle. The mixing chamber is filled with a mixture of products of the feedstock reaction plus a portion of the products of the combustion reaction. The combustion chamber is predominantly filled with the products of the combustion reaction. At 500, fresh feedstock and perhaps some recycled product gases are introduced into the mixing chamber to displace the products of the previous cycle from the end of the mixing chamber. At the same time, a combustible gas/air mixture is introduced into the combustion chamber, displacing the products of combustion from the end of the combustion chamber. At 502, all inlet and outlet valves are closed, creating a closed volume. At 504, the gases in the combustion chamber are then ignited resulting in a pressure and temperature increase within the combustion chamber. At 506, the passageways between the combustion chamber and the mixing chamber allow the combustible gas products to enter into the mixing chamber thereby compressing the feedstock gases and increasing their pressure and temperature. In addition, the hot combustion chamber gas products mix with the feedstock gases and thereby transfer their thermal energy to the feedstock gases, further increasing their temperature. The resulting temperature and pressure of the feedstock gases causes a reaction to occur. At 508, the reaction is allowed to proceed for a period of time to complete the desired reaction and develop the desired products. At 510, the pressure within the mixing chamber is rapidly lowered by releasing the products to an external volume (not shown). Combustion product gases remaining in the combustion chamber may be vented out with the mixing chamber gases or vented out separately though a dedicated port. The pressure reduction in the mixing chamber reduces the temperature and stops or quenches the reaction. This rapid depressurization and expansion also has the desirous effect of removing solid reaction products, such as carbon, from the reactor walls. In addition, the pressure wave generated from the combustion may strip carbon deposits from the reactor walls.

If the feedstock and combustible gases are premixed, the mixture may not ignite, as it is too rich. Therefore, the mixing chamber and combustion chamber are distinct and separate prior to ignition, such that no or preferably very little mixing occurs between the feedstock gas and the combustible gas.

Figure 6:
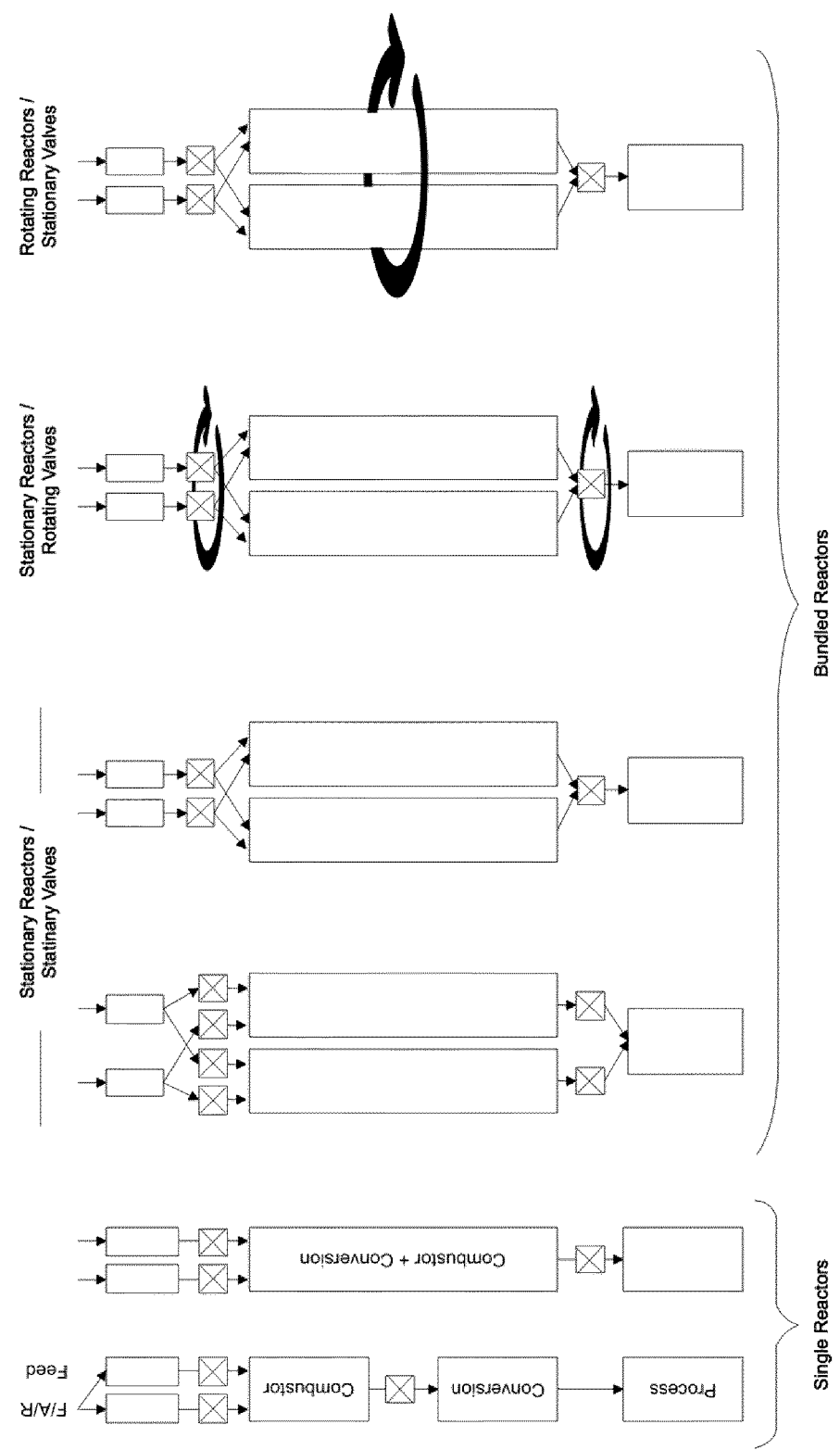
FIG. 6 shows different configurations of a system comprising bundled reactors operating out of phase, according to an embodiment of the disclosure.
Figure 7:
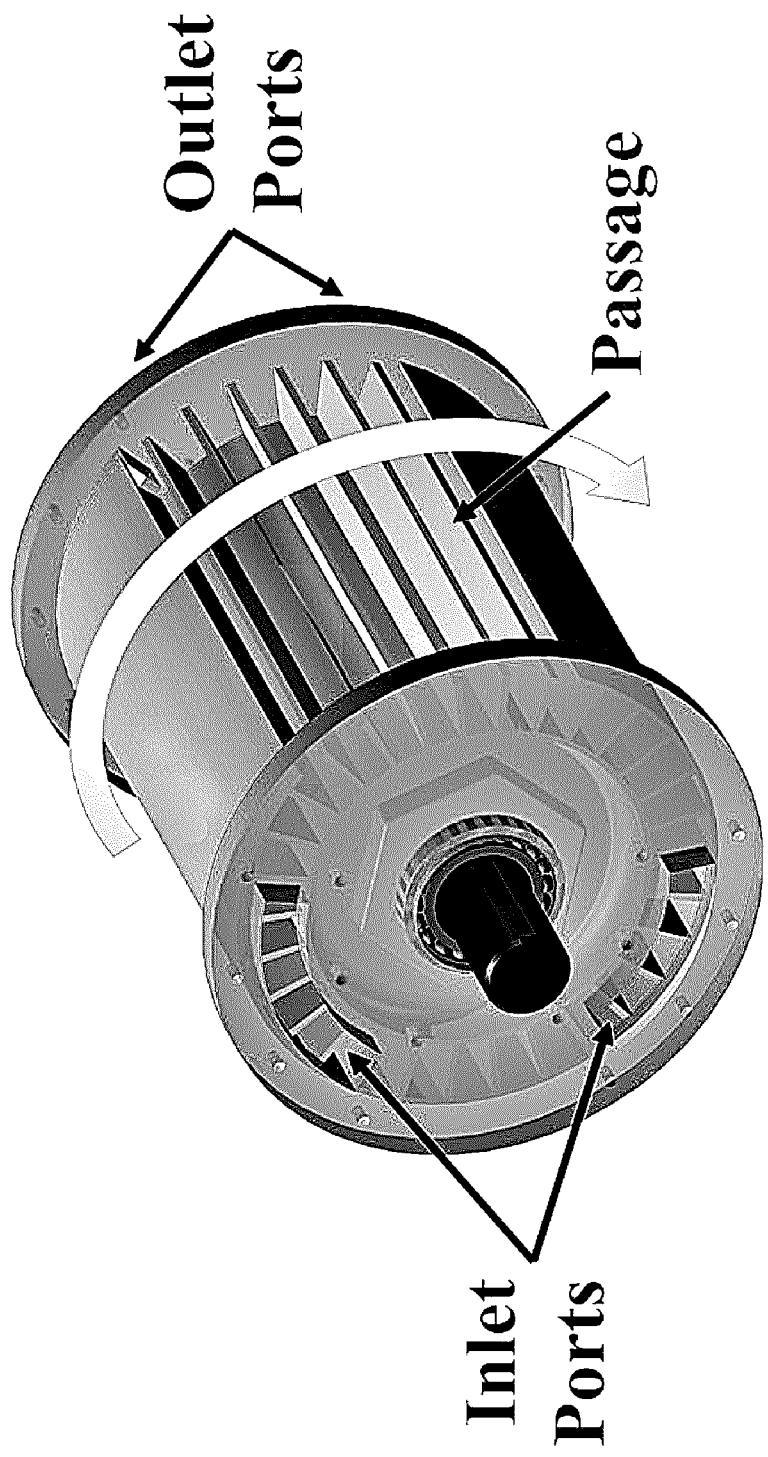
FIG. 7 shows bundled reactors rotating around stationary valves, according to an embodiment of the disclosure.

A number of reactor systems may be bundled together and operated slightly out of phase with each other to produce a continuous flow into and out of the reactor system. Valves can be stationary or rotating, as shown in FIG. 6. In some embodiment, the reactors can be rotated and the valves may remain stationary (see FIG. 7, modified from FIG. 2 of *Wave rotor design method with three steps including experimental validation*, Chan Shining et al., Journal of Engineering for Gas Turbines and Power, December 2017, the entirety of which is hereby incorporated by reference).

Various parameters may be adjusted to enable the reactor to work effectively. The feedstock gas may be preheated to just below the temperature at which it starts to react, before being introduced into the mixing chamber. A typical temperature would be in the range of 600 K-1,300 K, depending on the feedstock components and working pressures.

Furthermore, the combustible gas/oxidant mixture being introduced may also be preheated before entering the combustion chamber. A typical temperature would be in the range of 400 K-700 K depending on the combustible gases used. Preheating the combustible gas/oxidant mixture may improve the efficiency of the process such that more combustion energy is transferred to the reactants rather than being used to heat the products of combustion.

The volume ratio between the mixing chamber and combustion chamber should be set such that the correct amount of energy contained in the combustion chamber is provided to the mixing chamber to produce the desired products. There should also be sufficient combustible gas products entering the mixing chamber to provide effective mixing. A volume ratio of <10:1 is generally desired. When using air as the oxidant, nitrogen may be beneficial as a non-reactive gas that promotes a lower volume ratio and increases mixing. When using pure oxygen as the oxidant, another gas such as $CO_2$ may provide the same benefit as nitrogen in the air as oxidant case. Introducing additional $CO_2$ to the combustible gas mixture may result in greater solid carbon production.

The length-to-diameter ratio is important to obtain efficient energy transfer from the combustion chamber to the mixing chamber. Short, large-diameter reactors will tend to have poor mixing while long, skinny reactors will develop challenges in introducing the feedstock and combustible gases into the reactor along its length. A length-diameter ratio of <30:1 is generally desired.

Figure 13:
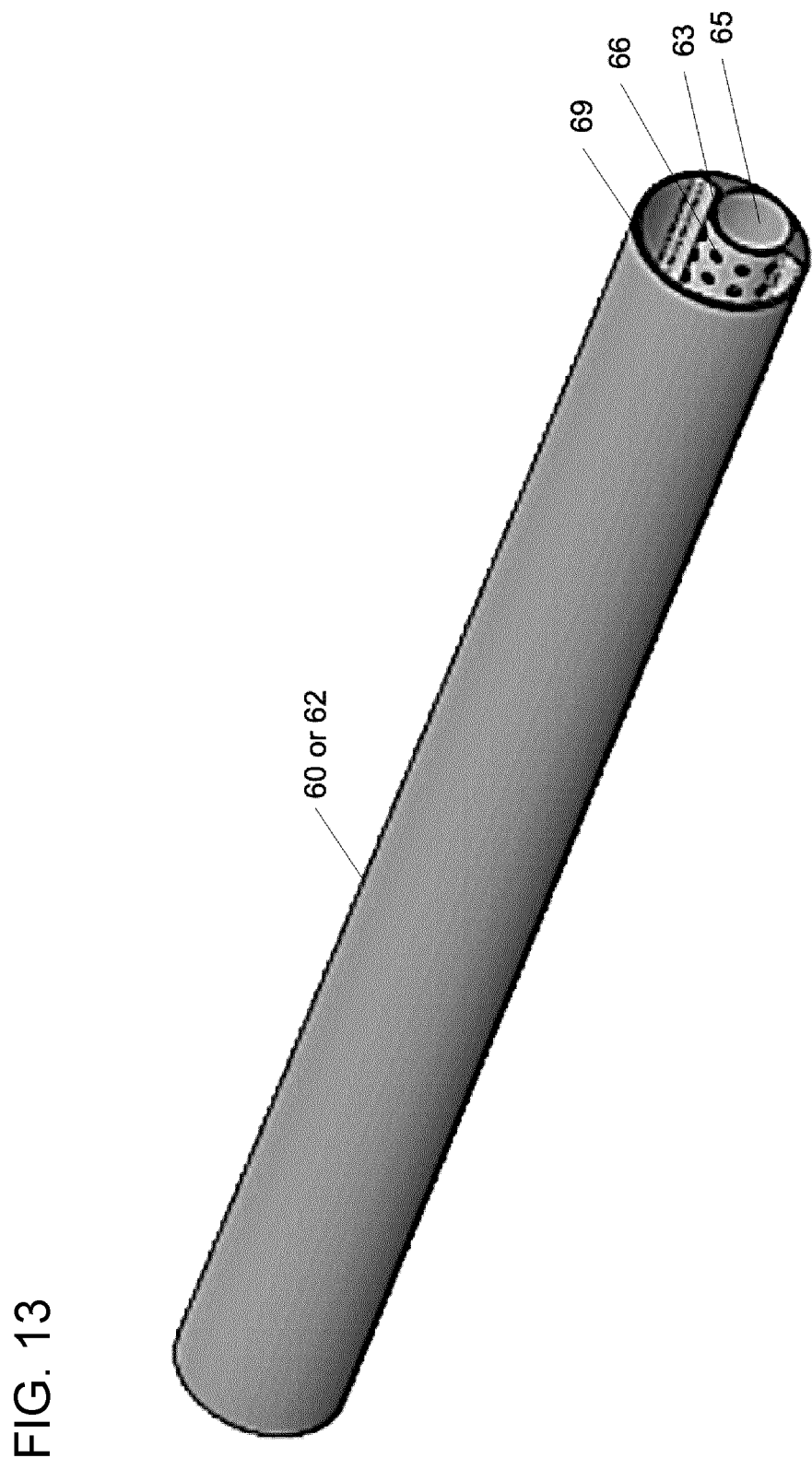
FIG. 13 shows a combustion chamber arranged within a mixing chamber, according to an embodiment of the disclosure.

According to some embodiments, the reactor uses methane (or natural gas) in addition to some recycled product gases as the feedstock gas, and a recycled gas/oxidant mixture as the combustible gases. The reactor may be designed and operated to maximize the production of hydrogen and solid carbon in the reaction products stream. The reactor may comprise a combustion chamber, being a perforated tube, inside a mixing chamber. The perforated combustion chamber may be offset from the center of the mixing chamber and bonded to a wall of the mixing chamber to provide structural integrity and support, as can be seen in FIG. 13. The mixing chamber/combustion chamber volume ratio may be less than or equal 10:1 and the length-to-diameter ratio may be 10:1. In some embodiments the mixing chamber/combustion chamber volume ratio may be about 6:1, and in some embodiments the mixing chamber/combustion chamber volume ratio may be about 3.5:1.

The reactor may be operated at a sufficiently high pressure such that the resulting hydrogen can be purified using standard pressure swing absorption technology. According to some embodiments, product gases such as unreacted methane ($CH_4$), carbon monoxide (CO) and some hydrogen are recycled and mixed with more methane to produce the feedstock gas mixture to the reactor. The combustible gas mixture comprises the recycled gas mixture in addition (in the case of an air-blown reactor) to the $CO_2$ removed from the $CO_2$ removal system, and pure oxygen. In some embodiments, the recycled gas mixture flowing to both the combustion and mixing chambers contains $CO_2$ in addition to $CH_4$, CO and $H_2$. The feedstock gas mixture and the combustible gas mixture are preheated to ~900K and ~600K respectively, from thermal energy recovered from the reactor products stream via a multi-stream heat exchanger. In alternative embodiments, the mixing chamber/combustion chamber volume ratio is 3.5:1, methane (or natural gas)/air mixture is used for the combustible gases.

With reference to FIGS. 8-14, there will now be described further embodiments of the disclosure.

Figure 8:
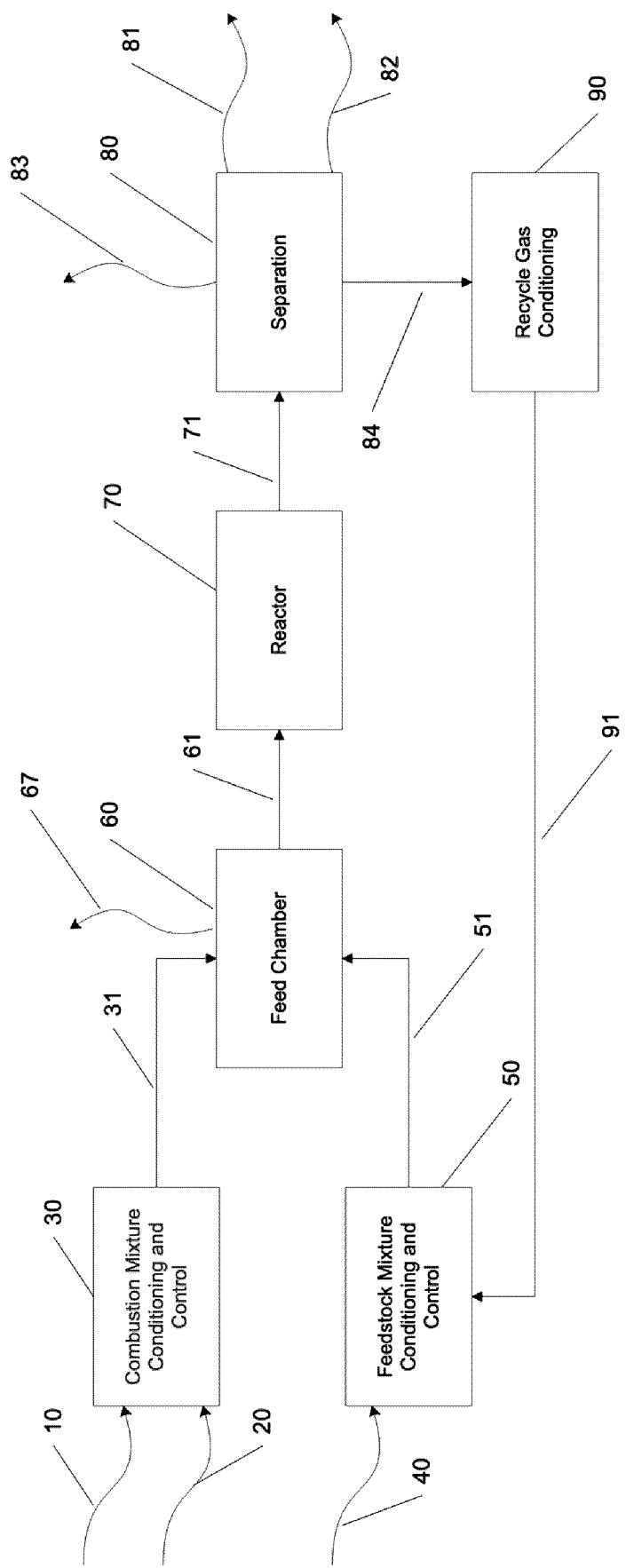
FIG. 8 is a schematic block diagram of a combustion chamber and a mixing chamber used to provide mixing of a feedstock gas with a combustible gas, and a third chamber to which the combustible and feedstock gas mixture is directed and in which one or more products are produced from the mixture, according to an embodiment of the disclosure.

With reference to FIG. 8, combustible gas 10 and oxidant gas 20 enter the combustion mixture conditioning and control system 30 which conditions the combustible gas mixture 31 to the correct temperature and pressure required by chamber 60. Feedstock gas 40 and recycle gas mixture 91 enter the feedstock mixture conditioning and control system 50 which conditions the feedstock mixture 51 to the correct temperature and pressure required by chamber 60. In some embodiments, a recycle gas mixture is not available and only the feedstock gas 40 enters the feedstock mixture conditioning and control system 50.

Chamber 60 is a constant volume device which uses the combustion energy from the conditioned combustible gas mixture 31 to increase the pressure and temperature of the conditioned feedstock mixture 51 to a reaction ready level. A combustion product gas mixture 67 comprising mainly of the combustion products of combusted conditioned combustible gas mixture 31 may be vented from chamber 60. The reaction ready gas mixture 61 enters the reactor 70, whereby it remains until the gas mixture is converted in a constant volume endothermic reaction to the reacted product mixture 71. The constant volume reaction is an unsteady process which operates in a batch mode and requires control of flow timing. This is accomplished by flow control in conditioning systems 30, 50, and separation and control system 80.

The reacted product mixture 71 enters the product separation and control system 80 which stops the reaction in reactor 70 by reducing the pressure and temperature of the desired reacted product mixture 71 and separates and/or purifies the individual product components 81, 82, the unwanted products 83 and the recycle gas mixture 84. The recycle gas mixture 84 enters the pre-conditioning recycle gas system 90 where the recycle gas mixture 84 is pre-conditioned to the desired temperature and pressure and flows to the feedstock mixture conditioning and control system 50.

In some embodiments, the combustible gas 10 and the feedstock gas 40 are natural gas, and the oxidant gas 20 is air. The desired reaction in reactor 70 is methane pyrolysis generally given by the following equation:

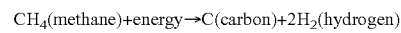

$$CH_4(\text{methane}) + \text{energy} \rightarrow C(\text{carbon}) + 2H_2(\text{hydrogen})$$

The individual product 81 is hydrogen gas, the individual product 82 is carbon, and the unwanted products 83 are primarily carbon dioxide, nitrogen and water. The recycle gas mixture 84 comprises primarily of unreacted natural gas, hydrogen, nitrogen and carbon monoxide.

Figure 9:
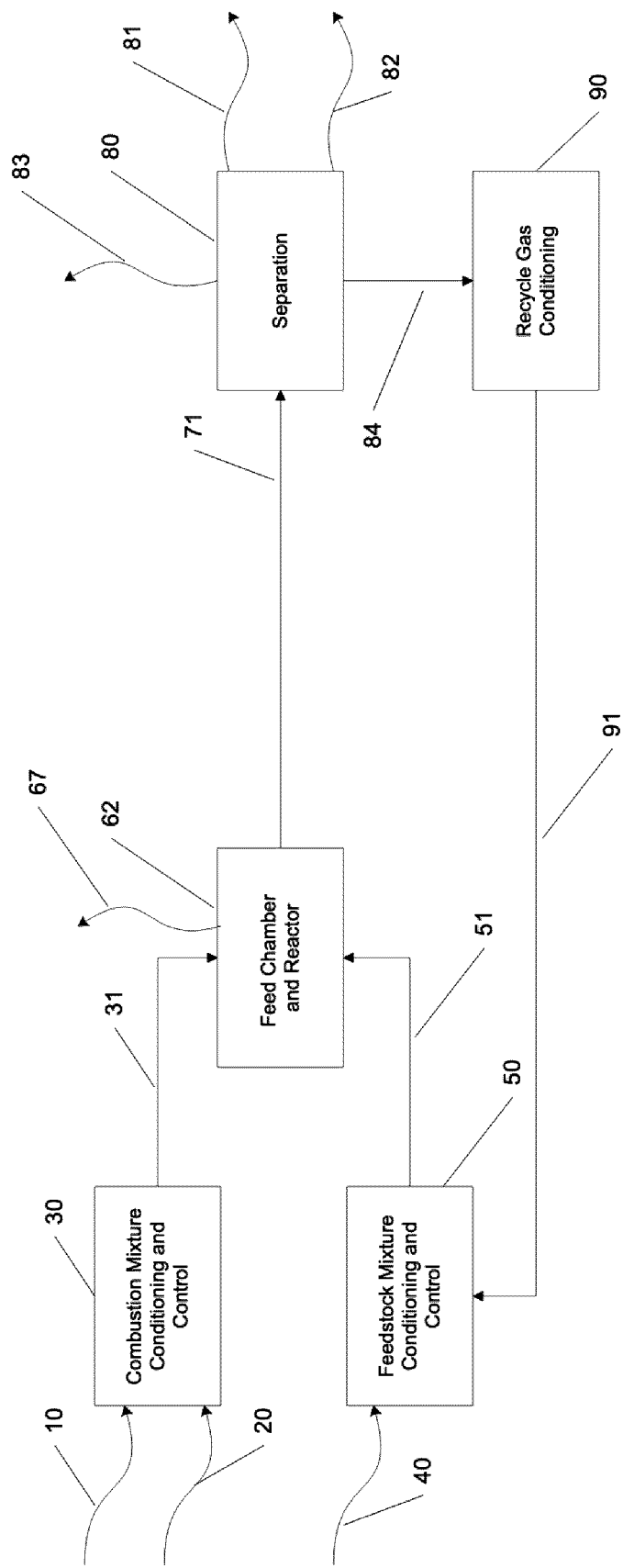
FIG. 9 is a schematic block diagram of a combustion chamber and a mixing chamber used to provide mixing of a feedstock gas with a combustible gas, and in which one or more products are produced from the mixture, according to an embodiment of the disclosure.

The system in FIG. 9 is similar to that of FIG. 8 with the exception that the chamber 60 and the reactor 70 are combined into the constant volume reactor 62.

Figure 10:
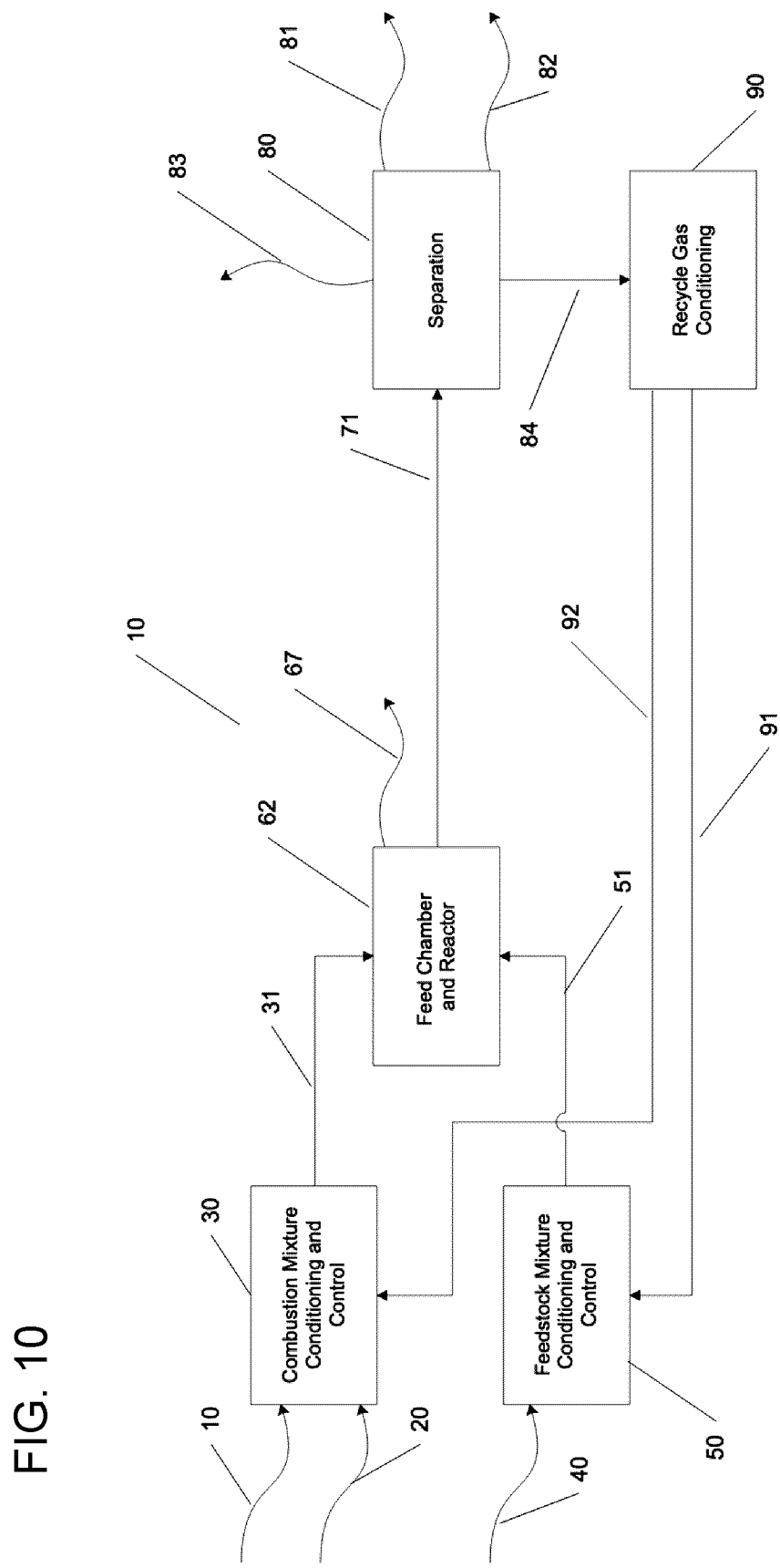
FIG. 10 is a schematic block diagram of a combustion chamber and a mixing chamber used to provide mixing of a feedstock gas with a combustible gas, and in which one or more products are produced from the mixture, and wherein recycled gases are used to provide thermal energy for the process, according to an embodiment of the disclosure.

FIG. 10 is similar to FIG. 9 but with a portion of recycle mixture 84, conditioned in pre-conditioned recycled gas conditioner 90, sent to the combustible gas conditioner and control system 30 to offset the amount of combustible gas 10 required.

Figure 11:
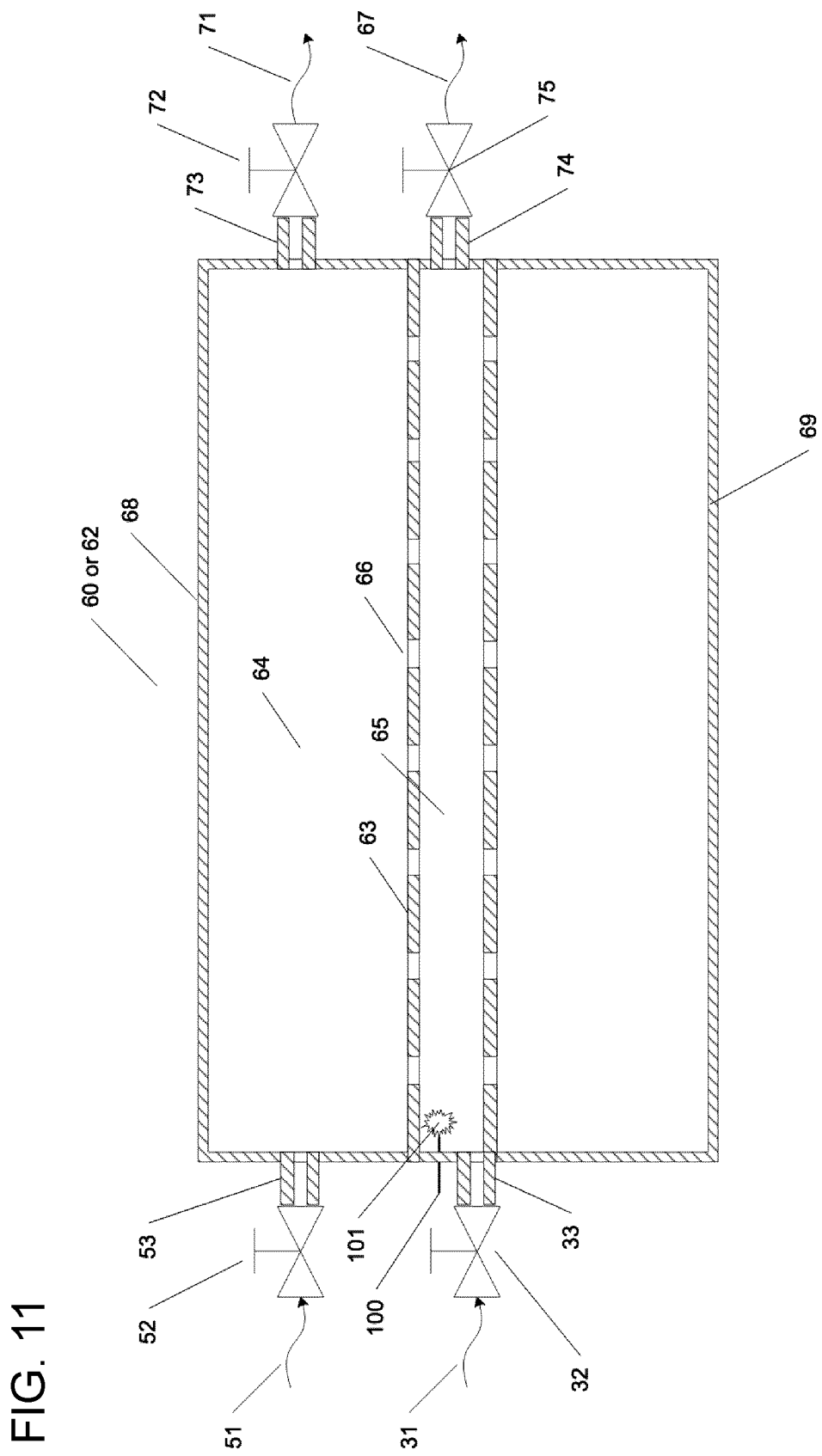
FIG. 11 is a schematic diagram of a combustion chamber located within a mixing chamber, according to an embodiment of the disclosure.

FIG. 11 represents a cross-sectional view of either chamber 60 or constant volume reactor 62. In this description, it represents constant volume reactor 62.

Constant volume reactor 62 comprises a combustion volume 65 contained within combustion chamber 63. Combustion chamber 63 is surrounded by reactor volume 64 which is contained in reactor chamber 68. Passageways 66 connect combustion volume 65 to reactor volume 64. Although combustion chamber 63 is shown in the center of reactor chamber 68, the combustion chamber 63 can be located anywhere in reactor chamber 68, including against the outside wall 69 of the reactor chamber 68.

Conditioned combustible gas mixture 31 enters combustion chamber 63 through combustible gas mixture valve 32 and passageway 33, displacing any combustion product gas mixture 67 present in combustion volume 65 out of reactor 62 via passageway 74 and combustion product valve 75. Conditioned feedstock gas mixture 51 enters mixing chamber 68 through feedstock gas mixture valve 52 and passageway 53, displacing desired reacted product mixture 71 in reactor volume 64 out of reactor 62 via passageway 73 and product valve 72. Both the conditioned combustible gas mixture 31 and the conditioned feedstock gas mixture 51 may simultaneously enter constant volume reactor 62 at the same pressure such that there is very little mixing via passageways 66.

Once predominantly all the combustible gas mixture 67 and desired product mixture 71 is displaced from reactor 62, combustion product valve 75 and product valve 72 are closed. Once the desired reactor pressure is reached, combustible gas mixture valve 32 and feedstock gas mixture valve 52 are closed, creating a closed volume in reactor 62. Igniter 100 creates ignition energy 101 which allows conditioned combustible gas mixture 31 in combustion chamber 63 to combust in an exothermic reaction creating combustion product gas mixture 67 at elevated temperature and pressure. Due to the resulting pressure difference between combustion chamber 63 and mixing chamber 68, a portion of combustible gas mixture 67 enters reactor volume 64, compressing feedstock gas mixture 51 to a higher pressure. Simultaneously, this portion of hot combustible gas mixture 67 mixes and heats feedstock gas mixture 51 by conduction, convection and radiation. Feedstock gas mixture 51 is now at an elevated temperature and pressure which creates the conditions for an endothermic reaction to occur. Constant volume reactor 62 is maintained as a closed volume until the endothermic reaction proceeds long enough to create desired product mixture 71. Once this condition is reached, product valve 72 and combustion product valve 75 are opened which drops the pressure and temperature, stopping the endothermic reaction. The process then repeats.

Figure 12:
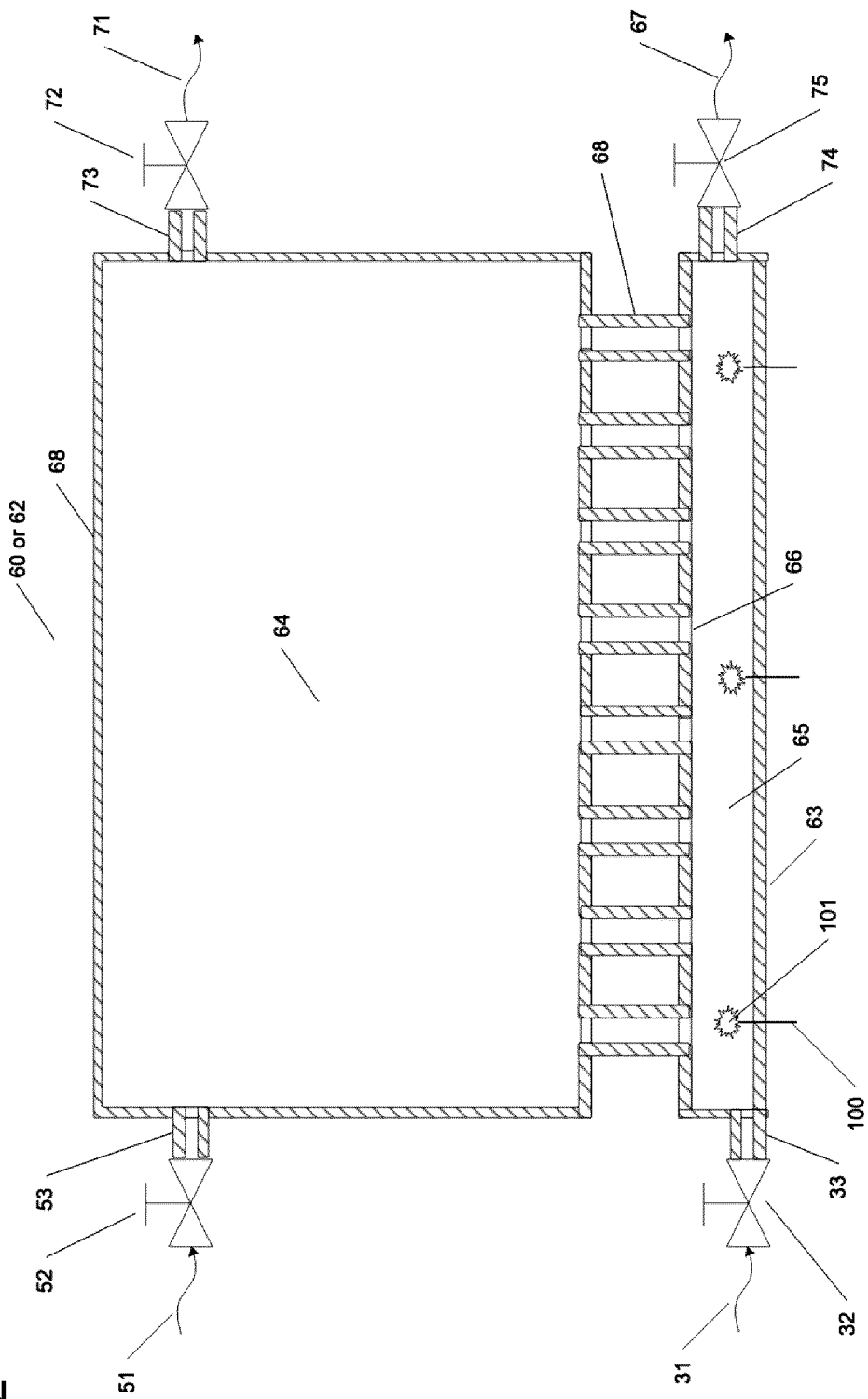
FIG. 12 is a schematic diagram of a combustion chamber located outside a mixing chamber, according to an embodiment of the disclosure.

FIG. 12 shows an embodiment of chamber 60 or constant volume reactor 62 with combustion chamber 63 external to mixing chamber 68. Combustion volume 65 is connected to reactor volume 64 via a number of passages 68. Multiple ignitors can be positioned along combustion chamber 63 to create specific combustion conditions if required. Multiple ignitors can also be positioned in the constant volume reactor 62 of FIG. 11 if the combustion chamber 63 is positioned next to reactor chamber wall 69.

FIG. 13 shows an isometric view of an embodiment of chamber 60 or constant volume reactor 62 with the combustion chamber 63 directly bonded with the reactor chamber wall 69 of reactor chamber 68. Directly bonding combustion chamber 63 to reactor chamber wall 69 provides structural support and alignment to combustion chamber 63, and essentially creates a one-piece chamber 60 or constant volume reactor 62.

In order to create a quasi or semi-continuous flow system, multiple chambers 60 or constant volume reactors 62 can be arranged together and operated out of phase such that each chamber or reactor is undergoing a different part of the process described in FIG. 11.

Figure 14:
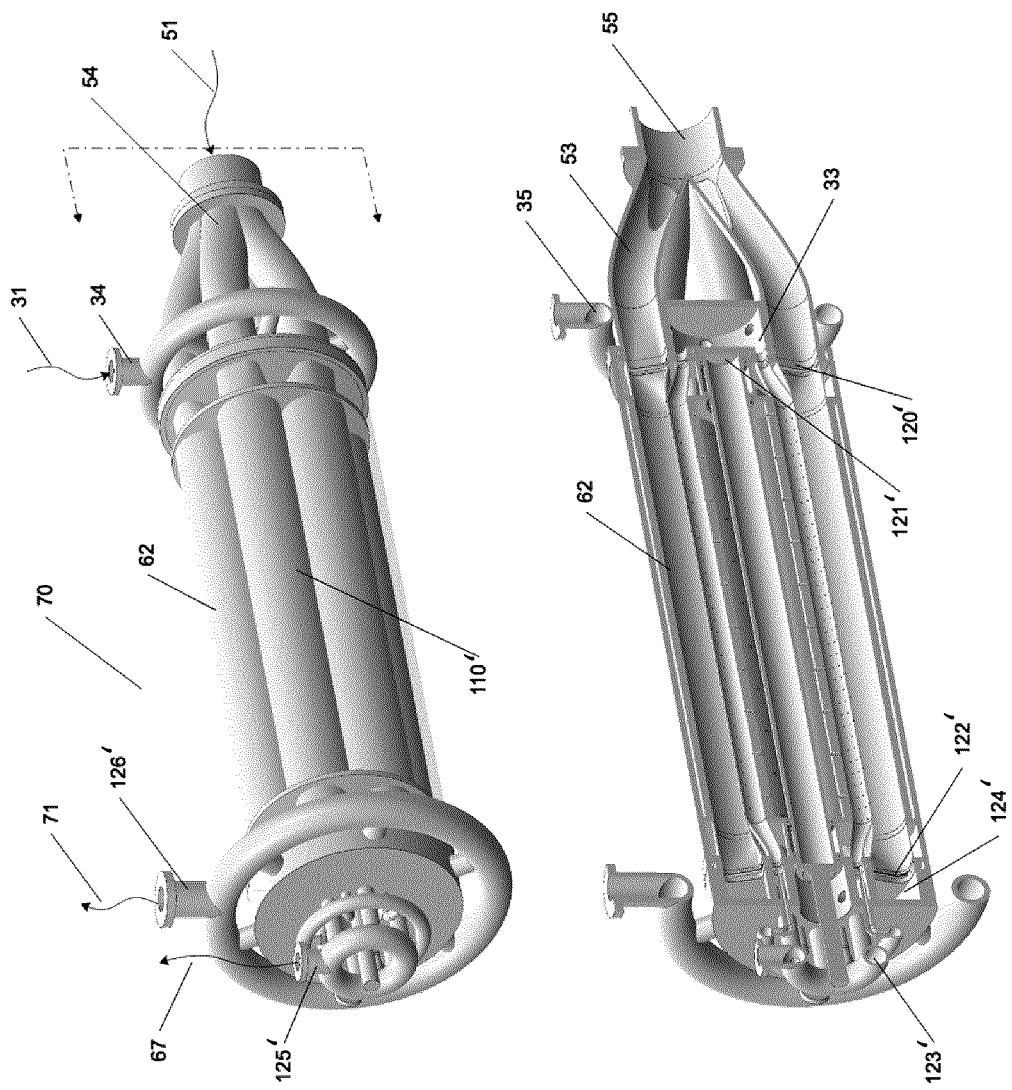
FIG. 14 shows a multi-reactor bundle with stationary reactors and rotating valves, according to an embodiment of the disclosure.

FIG. 14 shows an embodiment of a multi-tube reactor 110, with a multitude of individual constant volume reactors 62 shown in FIG. 14 arranged in a circular pattern. Conditioned combustible gas mixture 31 enters multitube reactor 110' via passageway 34 into plenum 35. Conditioned feedstock gas mixture 51 enters multitube reactor 110' via passageway 54 into plenum 55. Timing of conditioned combustion and conditioned feedstock gas mixtures entering multitube reactor 110' is controlled by inlet rotating valve 120' which is part of rotating valve assembly 121'. Inlet rotating valve 120' performs the same function as combustible gas mixture valve 32, passageway 33, feedstock gas mixture valve 52, and passageway 53 described in FIG. 11. The timing of combustion product gas mixture 67 and desired product mixture 71 leaving multitube reactor 110' is controlled by outlet rotating valve 122' which is part of rotating valve assembly 121'. Outlet rotating valve 122' performs the same function as combustion product valve 72, passageway 73, feedstock product valve 75, and passageway 74 described in FIG. 11.

Combustion product gas mixtures 67 from each constant volume reactor 62 is collected in combustion product plenum 123' and distributed out of the multitube reactor 110' via passageway 125'. Product mixture 71 from each constant volume reactor 62, is collected in product plenum 124' and distributed out of the multitube reactor 110' via passageway 126'.

There will now be described embodiments of the disclosure in which a feedstock gas reactor, such as any of the feedstock gas reactors described above in connection with FIGS. 4A-14, may be used to generate one or more products, including hydrogen and carbon, and in which at least some of the produced carbon is recirculated to the reactor in order to catalyze the reaction.

Figure 1A:
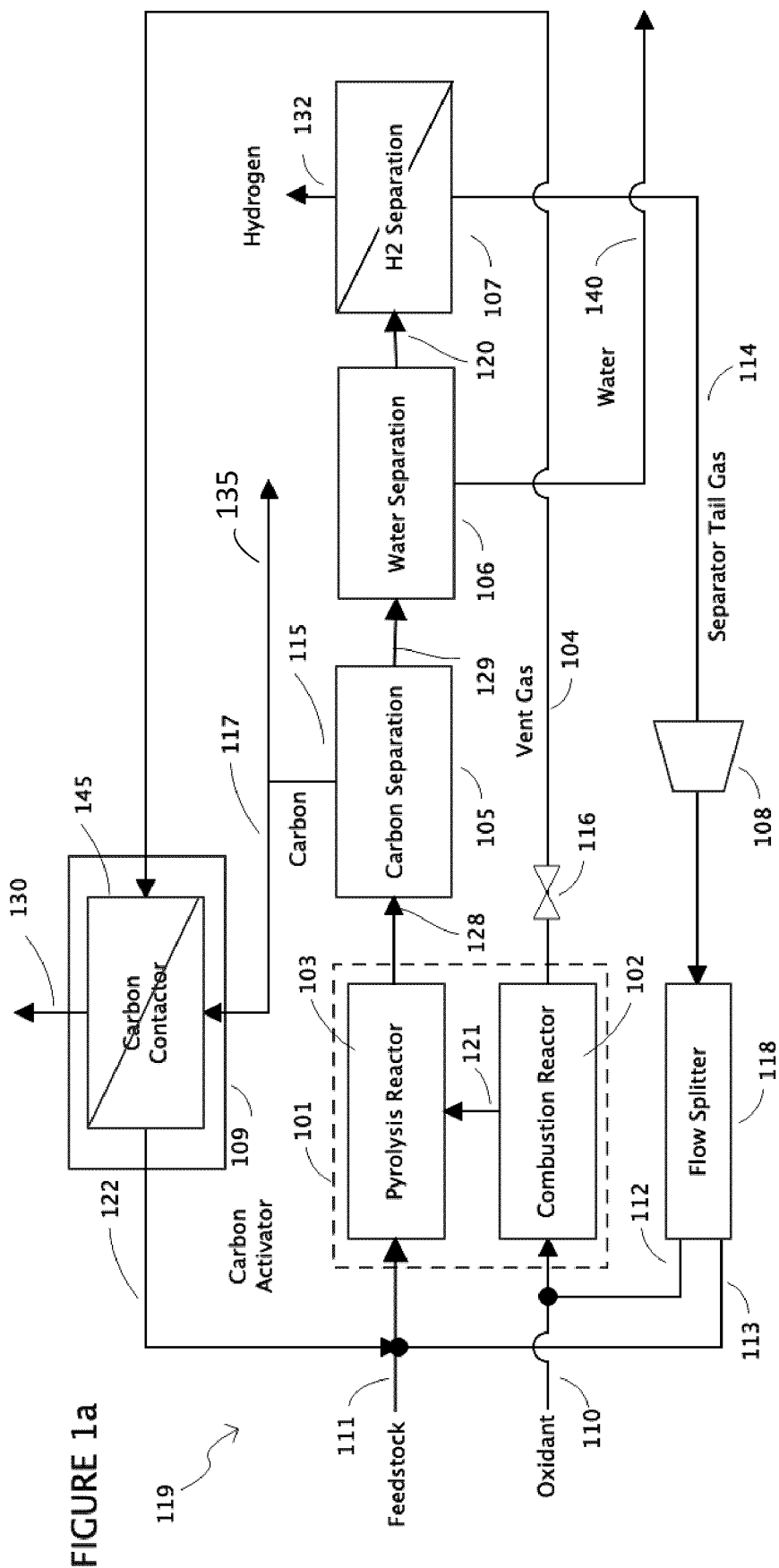
FIGS. 1a-1c illustrate systems for using vented gas to reactivate a portion of produced carbon, according to embodiments of the disclosure.

With reference to FIG. 1a, there is shown the operation of a pulsed flow batch reaction system 119, with hydrocarbon feedstock 111 and oxidant 110 loaded into a pulsed methane pyrolysis (PMP) reactor 101. The oxidant 110 is combined with a portion of the fuel feedstock 111 in a combustion reaction to generate the heat required to drive the pyrolysis reaction of the remaining feedstock 111. Since the reactor 101 is a closed, constant-volume device, once the feedstock 111 and oxidant 110 are loaded into the reactor 101, the combustion reaction both heats and pressurizes the reactor 101 to a point where thermal pyrolysis is initiated. The reaction is maintained within the reactor 101 for a desired hold time allowing the hydrocarbon feedstock 111 to be decomposed at which point the reactor 101 is opened to the downstream flow path, depressurizing the reactor 101 and quenching the reaction. At this point, a mixed product stream 128, containing hydrogen, solid carbon, unreacted feedstock, and products of the combustion reaction including carbon oxides ($CO_2$ and CO) and water, is extracted from the reactor 101. Carbon is removed from the mixed product stream 128 using a suitable carbon separator 105 which may be, for example, a filter or cyclone separator. Water 140 is also substantially removed from the mixed product stream 128 using a water separator 106, various types of which are known in the art. The resulting synthesis gas (syngas) stream 120 is passed to a hydrogen separator 107. The hydrogen separator 107 may be, for example, a pressure swing adsorption unit (PSA), a membrane separator, or a cryogenic separator. Once a recoverable fraction of $H_2$ is removed as a product stream 132, the residual tail gas 114 is recirculated back to the reactor 101. Stripped of carbon and the majority of hydrogen and water, the tail gas 114 still contains a mixture of unreacted feedstock, residual hydrogen that was not separated in the hydrogen separator 107, and carbon oxides such as $CO_2$ and CO.

The tail gas is 114 is passed through a compressor 108 and a flow splitter 118. The function of the flow splitter 118 is to allocate the appropriate amount of tail gas 114 back to the combustion chamber 102, creating sufficient energy to sustain the pyrolysis reaction of feedstock gas in the reaction chamber 103. In practice, the flow may be controlled either passively or actively. Passive means of controlling the flow may include physical flow paths with particular orifice sizes or flow path pressure drops such that the flow splits according to the desired ratio. Active control means may be employed to dynamically vary the split ratio during the operation of the reactor 101 in response to changing operating conditions or output rates. In this case, the control means may include active control valves, a variable diverter, or independently controlled recirculation compressors for each split stream 112, 113 fed from the same tail gas input 114. According to some embodiments, approximately 20% of the recirculated tail gas 114 is diverted to the combustion chamber 103.

Once the tail gas flow 114 has been split into a recycled combustion stream 112 and a recycled reaction stream 113, oxidant 110 is mixed with the combustion stream 112 to form a combustion gas mixture which is pre-heated and pressurized to the desired conditions. The pressure and temperature of the combustion gas mixture are controlled by a recycle stream compressor (not shown) and an oxidant feed compressor (not shown) which can be set to ensure the correct stoichiometry of oxidant to fuel contained in recycled combustion stream 112. The combustion gas mixture may be subsequently pre-heated (not shown) using heat recovered from the mixed product stream 128 as detailed, for example, in PCT Publication WO 2020/118417 A1, incorporated herein by reference in its entirety.

The feedstock 111 is similarly mixed with the recycled reaction stream 113 and controlled to the appropriate temperature and pressure by similar means. New feedstock 111 is added to the recycled reaction stream 113 to the extent there is volume available at the target temperature and pressure. Hence, new feedstock 111 will only make up for product removed from the system 119 or gas that has been vented, as described in further detail below. According to some embodiments, target temperature and pressure for the feedstock 111 at an inlet of reaction chamber 103 are about 1000 K and about 13.5 bar, target temperature and pressure for the combustible gas mixture 110 at an inlet of combustion chamber 102 are about 600 K and 13.5 bar, an oxidant stoichiometry is about 1.2, and a ratio of the volume of the combustion chamber 102 to the volume of the reaction chamber 103 is about 6:1, although these parameters can be varied over a wide range as deemed optimal for specific applications. Once the combustion and pyrolysis reactions have completed, as described above the contents of the reactor 101 are discharged and the mixed product stream 128 is quenched and directed to the carbon separator 105.

If the feedstock is pure, for example methane ($CH_4$), and the oxidant is also pure oxygen ($O_2$), the system 119 will yield a pure product stream 128 of hydrogen, carbon, water, and no other emissions. The $O_2$ can be supplied by an oxygen separation unit (ASU—not shown) which may operate based on different technologies such as a separation membrane, selective pressure, a temperature-based adsorption unit (PSA/TSA), or a cryogenic separator. The combustion products generated in the fuel oxidation step of the reaction will be fully decomposed by repeated cycling to the reactor 101, and no net $CO_2$ greenhouse gas emissions will be produced.

In practice, hydrocarbon and oxidant feedstocks used in industry are rarely 100% pure, and accommodations must be made to manage these impurities. For example, if natural gas is used as a feedstock, it is generally not comprised of only methane ($CH_4$). Rather, it may be predominantly methane (~70%-90%) and a mix of higher carbon-number hydrocarbon elements such as ethane ($C_2$), propane ($C_3$), butane ($C_4$), and ($C_{5+}$) molecules. The gas may also contain reactive non-hydrocarbon molecules such as carbon monoxide (CO) and hydrogen ($H_2$) as well as non-reactive components such as nitrogen ($N_2$), helium (He), and carbon-dioxide ($CO_2$). The fraction of impurities depends greatly on the source of the feedstock. Of most significance to the PMP process are impurities such as non-reactive or inert elements which cannot be further dissociated in the reactor nor converted to hydrogen, carbon, or water. Feedstock impurities such as $N_2$ and He in natural gas can range from trace quantities in the parts-per-million (ppm) up to 5% $N_2$ and 2% He by mole fraction. Oxygen ($O_2$) used as an oxidant may similarly include impurities such as $N_2$ and argon (Ar). Argon may be present in oxygen separated from air in quantities up to 4%.

In order to assist in the reduction of impurities, a volume of combustion products 104 can be vented to the environment by means of a vent 116. The vent 116 may be a controlled valve, a fixed orifice, a vent line of a fixed or selectable pressure drop, or a similar device. The frequency and duration of the venting may be metered and controlled, and therefore the relative quantity of gas vented as a fraction of the mixed product stream 128 may be adjusted. The vented gas preferably contains a high proportion of accumulated impurities (such as $N_2$ and Ar) and a low proportion of valuable reaction products ($H_2$ and solid carbon). After the combustion reaction occurs, a portion of the combustion products 121 expand into the reaction chamber 103 where they heat and pressurize the hydrocarbon feedstock. After the expansion and reaction are complete, the combustion chamber 102 and the reaction chamber 103 are at equal pressures and no further gas is exchanged. At this point in the process, the combustion chamber 102 contains only the residual fraction of combustion products that did not expand into the reaction chamber 103, and no products of the pyrolysis reaction. The gas composition within combustion chamber 102 is primarily a fraction of the accumulated impurities and non-reactive gases in the oxidant stream 110 and tail gas stream 114, and a fraction of the products of combustion comprising primarily $CO_2$ and water vapour. The vent system control may vary the residual combustion product gas that is vented as a fraction of the overall volume of residual gas in the combustion chamber 103 (from 0% to 100%). The vent 116 may be further operated at a desired frequency corresponding to a threshold of accumulated non-reactive gas constituents. This frequency may vary from once every reaction cycle, to once every n cycles. The frequency of venting may be fixed or variable depending on a measured gas or system performance quantity.

According to further embodiments of the disclosure, the hydrogen separator 107 may also have a selectivity to small molecules such as nitrogen. A pressure swing adsorption unit (PSA) employing a zeolite adsorption bed selectively adsorbs heavy molecules such as hydrocarbons (for example, methane ($CH_4$)), $CO_2$ and CO while allowing hydrogen to pass through, enabling an output stream of high-purity hydrogen (e.g., >99.5% purity if no other small molecules are present). If other small molecules such as nitrogen are present, however, the PSA may also allow to pass with the hydrogen a fraction of these species such that the hydrogen product stream 132 contains a dilute stream of impurities. For example, depending on the extraction source, natural gas may contain impurities of up to 5% by mole, and oxygen separated from air may contain impurities of up to 4% by mole. With this upper level of impurities, the product hydrogen stream 132 could have a purity of approximately 96%. The PSA may also act as a selective venting means for accumulated nitrogen. Because the PSA effectively selectively separates between 80% to 90% of the target species (in this case hydrogen with some $N_2$), only 10% to 20% of hydrogen product and accumulated $N_2$ is recycled back to the reactor 101. According to some embodiments, a PSA $H_2$ separator 107 is employed which minimizes the degree of combustion product venting required to suppress the accumulation of feedstock impurities. The PSA adsorption materials can be tailored for the filtering selectivity of the PSA, enabling an added degree of freedom to further optimize the competing constraints of hydrogen purity, vent gas quantity, reactor product yield efficiency, and reactor throughput capacity.

As described above, in practice, feedstock 111 and oxidant 110 are not completely pure and as such accommodations must be made to manage these impurities to avoid them building up in concentration until, eventually, reactor 101 stops producing hydrogen 132 and carbon 115. Therefore, as described above, a portion of the combustion product gases within combustion chamber 102 are vented as vent gas stream 104, using valve 116. Vent gas stream 104 is at a high temperature (1000-2000 K) and also contains $H_2O$ and $CO_2$ in addition to impurities. As can be seen in FIG. 1a, vent gas stream 104 is directed to a carbon activator 109 where the vent gas is used to activate a portion of carbon 117 separated from mixed product stream 128 by carbon separator 105, by bringing carbon 117 into contact with the vent gas in a carbon contactor 145. Carbon contactor 145 may be, for example, a fluidized bed reactor, a packed bed reactor, or a rotary kiln. The activated carbon 122 is mixed with feedstock 111 before being introduced into reactor 103. Activation is a process which partially gasifies carbon using $CO_2$ and/or $H_2O$ (according to some embodiments, at 800-900 degrees Celsius) to increase one or more of its surface area, microporous structure, and surface reactivity according to the following equations:

$$C + H_2O \rightarrow CO + H_2$$

$$C + CO_2 \rightarrow 2CO$$

Product carbon stream 135 represents a portion of product carbon that is not directed to carbon activator 109.

An exhaust stream 130 directed out of carbon activator 109 may comprise any combination of $H_2$, CO, $CO_2$, $H_2O$, and impurities, and may be used directly in other processes such as methanol or ammonia production, to generate heat, or may simply be vented to the atmosphere. Exhaust stream 130 may also be sent to a water-gas-shift reactor to produce additional $H_2$.

Since CO and $H_2$ are not greenhouse gases, the GHG intensity of the PMP process with direct carbon activation is 0 kg CO2/kg $H_2$. However, if exhaust stream 130 is flared, the CO gets converted into $CO_2$ and the GHG intensity of the process may increase to 0.87 kg $CO_2$/kg $H_2$.

Figure 1B:
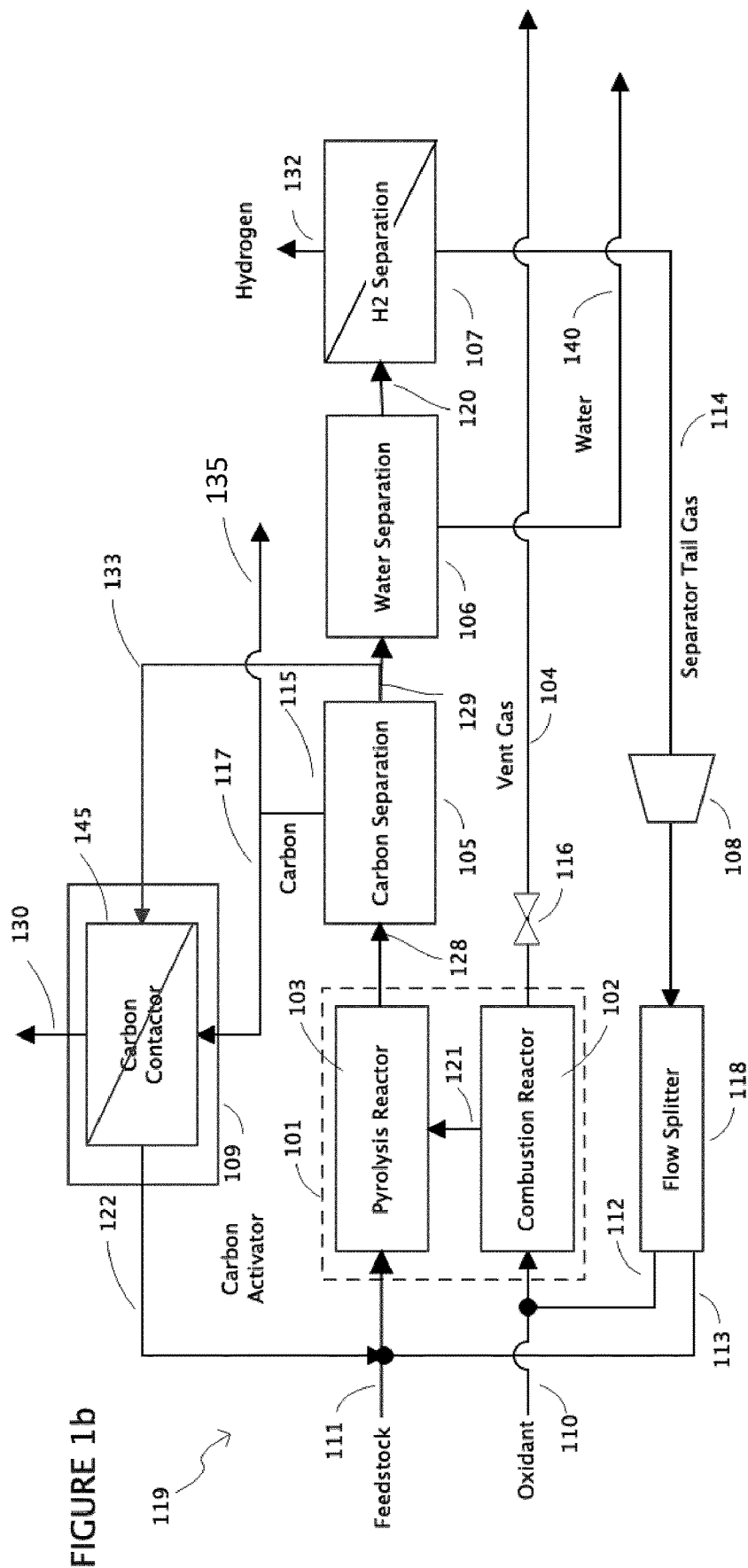
Figure 1C:
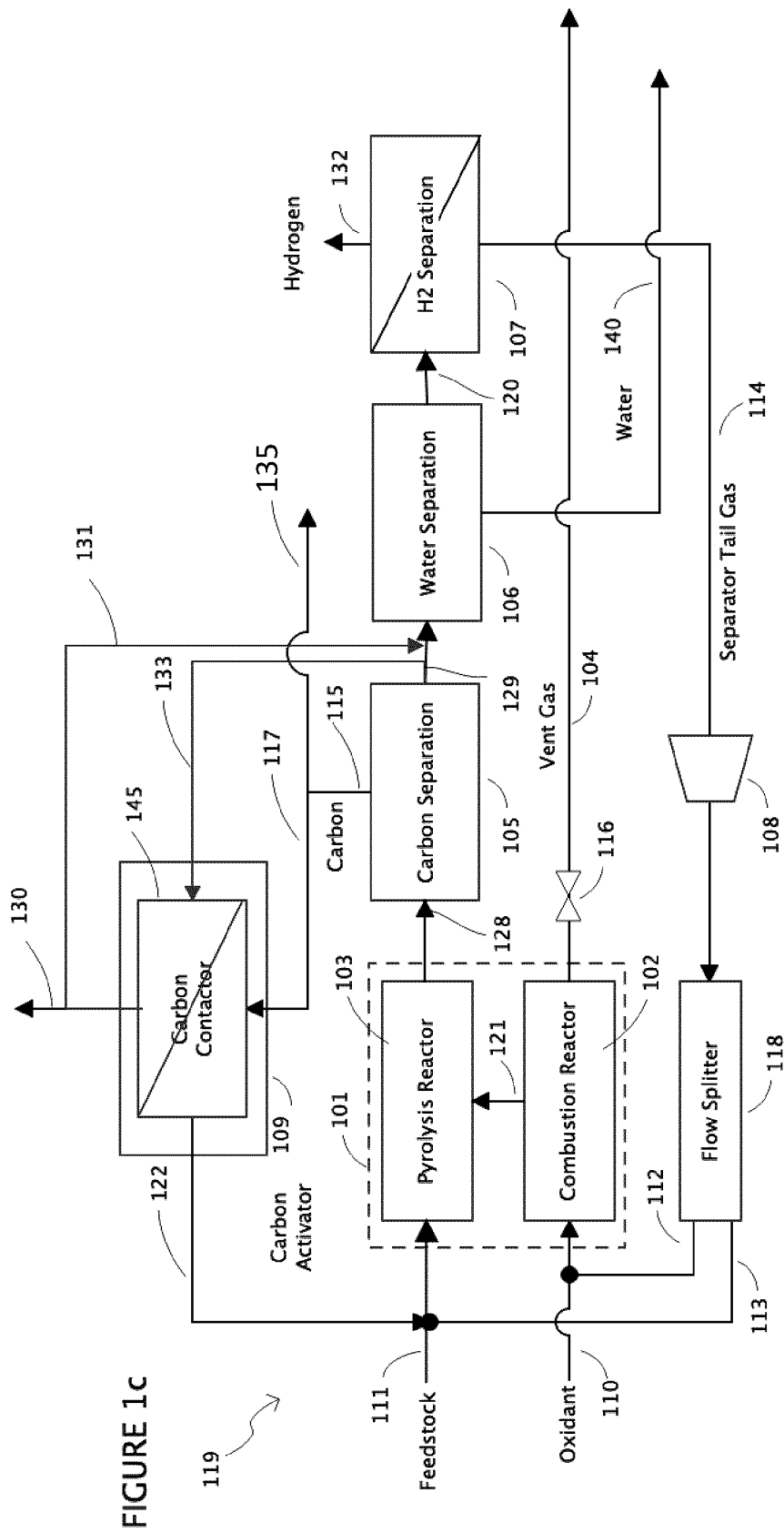

FIGS. 1b and 1c show variations of system 119 shown in FIG. 1a. For example, in FIG. 1b, carbon 117 is activated in carbon activator 109 using gas vented from the output gaseous stream 129 of carbon separator 105. Therefore, carbon 117 does not have to be activated using vent gas 104 from combustion chamber 102, and according to some embodiments may be activated using gas vented from another portion of system 119. For example, according to some embodiments (not shown), gas may be vented directly from mixed product stream 128, and this vented gas may be used to activate carbon 117 in carbon activator 109. In FIG. 1c, a portion 131 (or all) of exhaust stream 130 is mixed with gaseous stream 129 exiting carbon separator 105 and entering water separator 106. In this way, unreacted $H_2O$ in exhaust stream 130 is removed by water separator 106, the $H_2$ is separated by $H_2$ separator 107, and CO is sent back to reactor 101 in separator tail gas 114.

Figure 2:
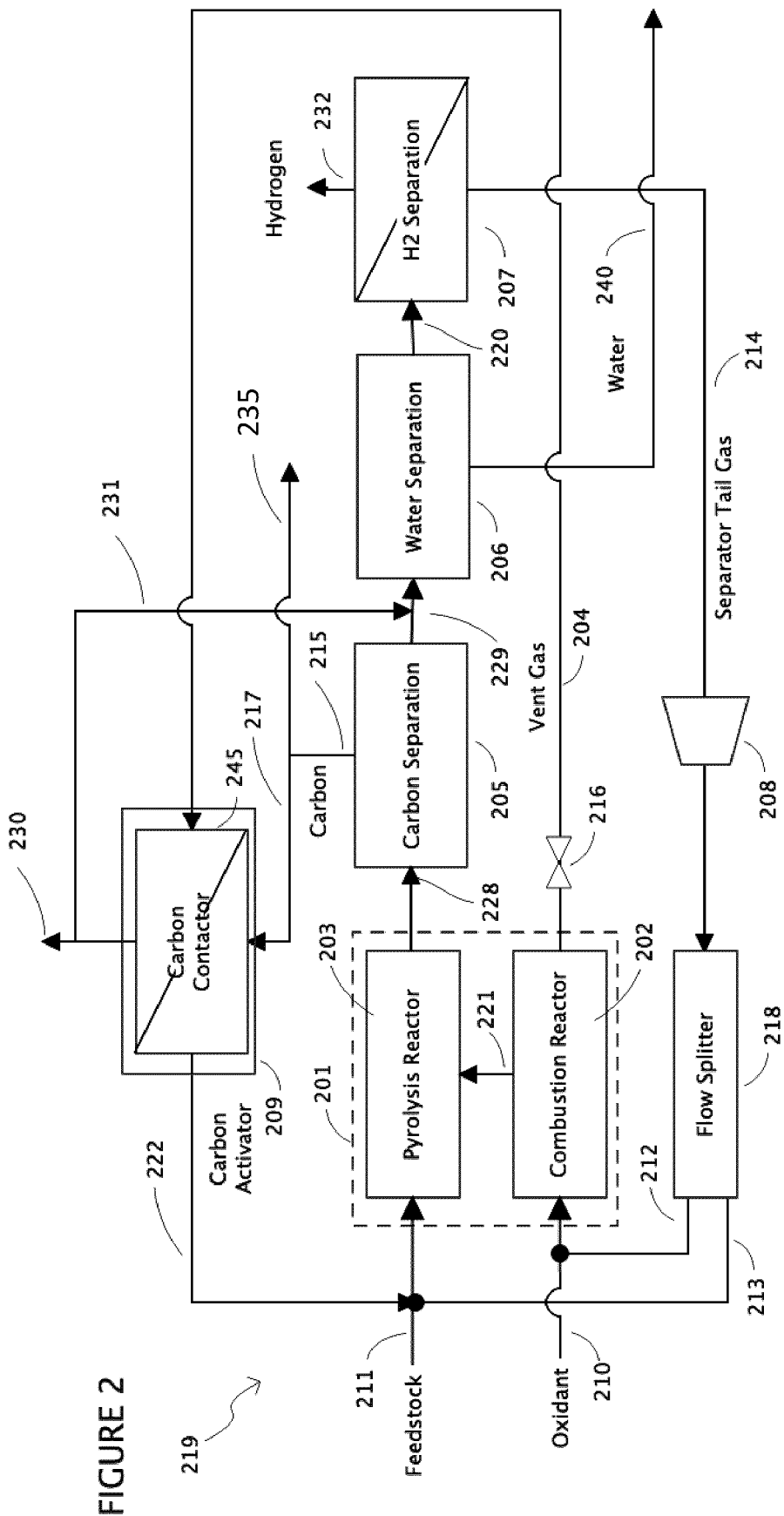
FIG. 2 illustrates a system using vented gas to directly reactivate a portion of produced carbon, according to an embodiment of the disclosure.

Referring now to FIG. 2, there is shown an embodiment of a system 219 for recycling carbon to a feedstock reactor. System 219 is similar to system 119 shown in FIG. 1a, with like elements being labeled with like reference numbers. In system 219, vent gas stream 204 is directed to carbon activator 209 comprising a carbon contactor 245 and whereat the vent gas is used to directly activate, in carbon contactor 245, a portion of produced carbon 217 separated from mixed product stream 228 by carbon separator 205. The activated carbon 222 is mixed with feedstock 211 before being introduced into reactor 203. A portion 231 of exhaust stream 230 is mixed with gaseous stream 229 exiting carbon separator 205 and entering water separator 206. In this way, unreacted $H_2O$ in exhaust stream 230 is removed by water separator 206, the $H_2$ is separated by $H_2$ separator 207, and CO is sent back to reactor 201 in separator tail gas 214

Figure 3:
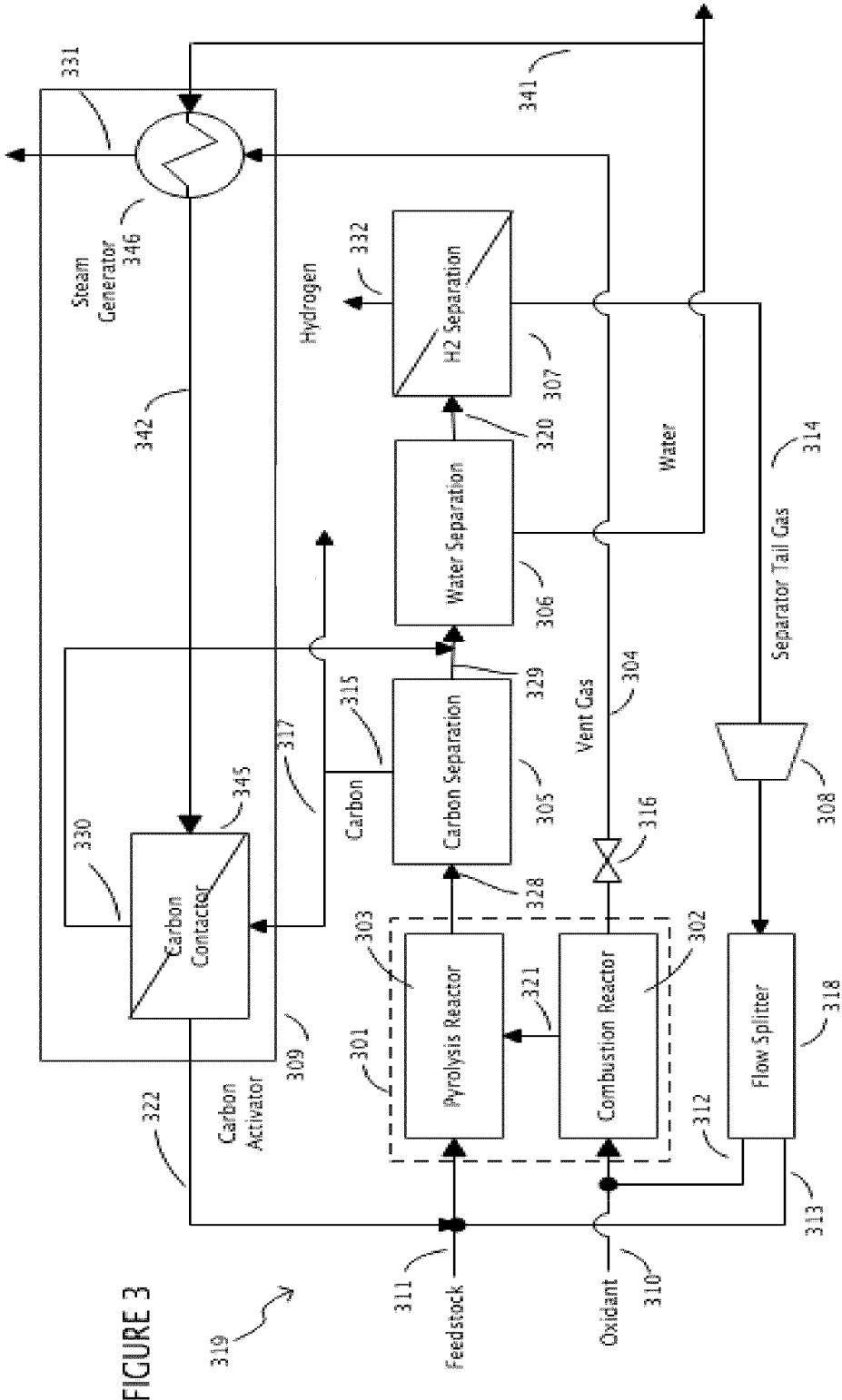
FIG. 3 illustrates a system using vented gas to indirectly reactivate a portion of produced carbon, according to an embodiment of the disclosure.

Turning now to FIG. 3, there is shown an embodiment of another system 319 for recycling carbon to a feedstock reactor. System 319 is similar to system 219 shown in FIG. 2, with like elements being labeled with like reference numbers. In system 319, vent gas stream 304 is directed to a carbon activator 309 comprising a carbon contactor 345 and a steam generator 346. The hot vent gas is used to create high-temperature steam 342 by heating, in the steam generator 346, a portion of the water 341 separated from mixed product stream 328 by water separator 305. Cooled vent gases 331 are seen exiting steam generator 346. The high-temperature steam 342 is directed to carbon contactor 345 whereat a portion of carbon 317 separated from mixed product stream 328 by water separator 305 is activated by its interaction with high-temperature steam 342. The activated carbon 322 output from carbon activator 309 is mixed with the feedstock 311 before being introduced into the pyrolysis reactor 303. The activation reaction is:

$$C + H_2O \rightarrow CO + H_2$$

Exhaust stream 330 is mixed with gaseous stream 329 exiting carbon separator 305 and entering water separator 306. In this way, unreacted $H_2O$ in exhaust stream 330 is removed by water separator 306, the $H_2$ is separated by $H_2$ separator 307, and CO is sent back to reactor 301 in separator tail gas 314.

In the embodiment of FIG. 3, the GHG intensity of the PMP process may be the same as the base case of PMP without carbon activation: 0.36 kg $CO_2$/kg $H_2$.

The word "a" or "an" when used in conjunction with the term "comprising" or "including" in the claims and/or the specification may mean "one", but it is also consistent with the meaning of "one or more", "at least one", and "one or more than one" unless the content clearly dictates otherwise. Similarly, the word "another" may mean at least a second or more unless the content clearly dictates otherwise.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through one or more intermediate elements or devices via an electrical element, electrical signal or a mechanical element depending on the particular context. The term "and/or" herein when used in association with a list of items means any one or more of the items comprising that list.

As used herein, a reference to "about" or "approximately" a number or to being "substantially" equal to a number means being within +/−10% of that number.

While the disclosure has been described in connection with specific embodiments, it is to be understood that the disclosure is not limited to these embodiments, and that alterations, modifications, and variations of these embodiments may be carried out by the skilled person without departing from the scope of the disclosure. It is furthermore contemplated that any part of any aspect or embodiment discussed in this specification can be implemented or combined with any part of any other aspect or embodiment discussed in this specification.

The invention claimed is:

1. A method of using a feedstock gas reactor comprising a reaction chamber fluidly connected to a combustion chamber via one or more fluid flow paths, the method comprising:

introducing a feedstock gas comprising a hydrocarbon into the reaction chamber;

introducing a combustible gas into the combustion chamber; and combusting the combustible gas in the combustion chamber so as to form one or more combustion product gases and so as to cause at least a portion of the one or more combustion product gases to flow into the reaction chamber via the one or more fluid flow paths and mix with the feedstock gas, wherein, as a result of the mixing of the at a least a portion of the one or more combustion product gases with the feedstock gas, energy is transferred from the at least a portion of the one or more combustion product gases to the feedstock gas and thereby causes a chemical reaction to decompose the feedstock gas into one or more reaction product gases comprising hydrogen;

extracting a mixed product stream from the feedstock gas reactor, wherein the mixed product stream comprises hydrogen, carbon, and water;

generating a vent gas stream comprising one or more oxidizing gases output from the feedstock gas reactor;

activating at least some of the carbon using the vent gas stream; and recycling at least some of the activated carbon to the feedstock gas reactor.

2. The method of claim 1, wherein generating the vent gas stream comprises:
venting at least a portion of the one or more combustion product gases from the combustion chamber.

3. The method of claim 1, wherein generating the vent gas stream comprises:
separating at least some of the carbon from the mixed product stream so as to produce a carbon-depleted mixed product stream; and
venting one or more gases from the carbon-depleted mixed product stream.

4. The method of 1, wherein activating at least some of the carbon comprises:
separating at least some of the carbon from the mixed product stream; and
activating the separated carbon.

5. The method of claim 1, wherein activating at least some of the carbon comprises:
reacting the at least some of carbon with the vent gas stream.

6. The method of claim 1, wherein activating at least some of the carbon comprises:
heating water with the vent gas stream to produce steam; and
reacting the at least some of the carbon with the steam in the carbon contactor.

7. The method of claim 6, wherein heating the water with the vent gas stream comprises:
separating at least some of the water from the mixed product stream; and
heating the separated water with the vent gas stream.

8. The method of claim 1, wherein activating at least some of the carbon comprises activating the at least some of the carbon in a carbon contactor.

9. The method of claim 8, further comprising:
extracting from the carbon contactor an exhaust stream generated from the activation of the at least some of the carbon.

10. The method of claim 9, further comprising one or more of:
burning the extracted exhaust stream; and
using the extracted exhaust stream for chemical or fuel production.

11. The method of claim 9, wherein the exhaust stream comprises CO and $H_2$.

12. The method of claim 9, further comprising:
recycling at least some of the extracted exhaust stream to the mixed product stream.

13. The method of claim 12, wherein:
the method further comprises separating at least some of the carbon from the mixed product stream to form a carbon-depleted mixed product stream; and
recycling the at least some of the extracted exhaust stream comprises combining the recycled exhaust stream with the carbon-depleted mixed product stream.

14. The method of claim 1, further comprising separating at least some of the hydrogen from the mixed product stream using one or more of: a membrane separator; a polymeric membrane separator; a palladium membrane separator; chemical adsorption; pressure swing adsorption; and temperature swing adsorption.

15. A system comprising:
a feedstock gas reactor comprising:
a reaction chamber; and
a combustion chamber fluidly connected to the reaction chamber via one or more fluid flow paths; and
an igniter;
valving for controlling flow of gases into and out of the feedstock gas reactor; and
one or more controllers configured to perform a method comprising:
controlling the valving to introduce a feedstock gas comprising a hydrocarbon into the reaction chamber;
controlling the valving to introduce a combustible gas into the combustion chamber; and
controlling the igniter to combust the combustible gas in the combustion chamber so as to form one or more combustion product gases and so as to cause the one or more combustion product gases to flow into the reaction chamber via the one or more fluid flow paths and mix with the feedstock gas, wherein, as a result of the mixing of the one or more combustion product gases with the feedstock gas, energy is transferred from the one or more combustion product gases to the feedstock gas and thereby causes a chemical reaction to decompose the feedstock gas into one or more reaction product gases comprising hydrogen;
controlling the valving to extract a mixed product stream from the feedstock gas reactor, wherein the mixed product stream comprises hydrogen, carbon, and water; and
controlling the valving to generate a vent gas stream comprising one or more oxidizing gases output from the feedstock gas reactor;
controlling the valving to activate at least some of the carbon using the vent gas stream; and
controlling the valving to recycle at least some of the activated carbon to the feedstock gas reactor.

16. The system of claim 15, further comprising a carbon separator for separating at least some of the carbon from the mixed product stream.

17. The system of claim 16, wherein the carbon separator comprises one or more of: a cyclone; a sintered metal filter; and a bag filter.

18. The system of claim 15, further comprising a carbon contactor for activating at least some of the carbon.

19. The system of claim 18, wherein the carbon contactor comprises one or more of: a fluidized bed reactor; a packed bed reactor; and a rotary kiln.

20. The system of claim 15, further comprising a hydrogen separator for separating at least some of the hydrogen from the mixed product stream.

21. The system of claim 20, wherein the hydrogen separator is pressure swing adsorption device.

* * * * *

UNITED STATES PATENT AND TRADEMARK OFFICE
CERTIFICATE OF CORRECTION

PATENT NO. : 11,642,640 B2
APPLICATION NO. : 17/802507
DATED : May 9, 2023
INVENTOR(S) : Christopher Edwin John Reid, Kenneth William Kratschmar and David Aaron Leboe It is certified that error appears in the above-identified patent and that said Letters Patent is hereby corrected as shown below:

On the Title Page

Item (72), delete "Burnaby" and insert -- Vancouver --

Signed and Sealed this
Twenty-fourth Day of September, 2024

Katherine Kelly Vidal
*Director of the United States Patent and Trademark Office*